(12) United States Patent
Von Bergen et al.

(10) Patent No.: US 7,337,295 B2
(45) Date of Patent: Feb. 26, 2008

(54) MEMORY MANAGEMENT FRAME HANDLER

(75) Inventors: Axel Von Bergen, Wiesloch (DE); Volker Sauermann, Heidelberg (DE); Arne Schwarz, Heidelberg (DE)

(73) Assignee: SAP Aktiengesellschaft, Walldorf (DE)

( * ) Notice: Subject to any disclaimer, the term of this patent is extended or adjusted under 35 U.S.C. 154(b) by 357 days.

(21) Appl. No.: 10/625,897

(22) Filed: Jul. 24, 2003

(65) Prior Publication Data

US 2005/0021923 A1 Jan. 27, 2005

(51) Int. Cl.
*G06F 12/00* (2006.01)

(52) U.S. Cl. .................... 711/170; 707/205

(58) Field of Classification Search .............. 711/170
See application file for complete search history.

(56) References Cited

U.S. PATENT DOCUMENTS

| | | | |
|---|---|---|---|
| 4,849,905 A | 7/1989 | Loeb et al. | |
| 5,355,473 A | 10/1994 | Au | |
| 5,557,786 A | 9/1996 | Johnson, Jr. | |
| 5,737,732 A | 4/1998 | Gibson et al. | |
| 5,784,699 A * | 7/1998 | McMahon et al. | 711/171 |
| 5,930,827 A * | 7/1999 | Sturges | 711/170 |
| 7,007,149 B2 * | 2/2006 | Chung | 711/170 |
| 2002/0032676 A1 | 3/2002 | Wheat et al. | |

FOREIGN PATENT DOCUMENTS

EP 0 657 830 A1 6/1995
WO WO 02/061612 A 8/2002
WO WO 02/061613 A 8/2002

OTHER PUBLICATIONS

Date, C.J., "Introduction to Database Systems, vol. 1," 1990, Addison Wesley, Reading, MA, USA, paragraph '03.6!, figs. 3.17 and 3.18.
Haerder, Theo and Erhard Rahm, "Datenbanksysteme," 1999, Springer, Heidelberg, pp. 207-210, 227-233, figs. 7.15, 8.1 and 8.2.B, English translation provided, 10 pgs.

* cited by examiner

*Primary Examiner*—Brian R. Peugh
*Assistant Examiner*—Matthew Bradley
(74) *Attorney, Agent, or Firm*—Fish & Richardson P.C.

(57) ABSTRACT

A frame handler for application-level memory management includes an associated block of memory divided into instances such that data elements may be stored in the instances, a data structure identifying the unused instances within the block of memory, and an application interface operable to receive a request for an unused instance from a software application. The frame handler is operable to identify an unused instance in response to a request received by the application interface. In addition, a software application using application-level memory management includes an application-level memory manager operable to allocate a block of memory to store data elements with the block of memory divided into frames and each frame divided into instances, and application code operable to store data elements in instances of a block of memory allocated by the application-level memory manager.

28 Claims, 22 Drawing Sheets

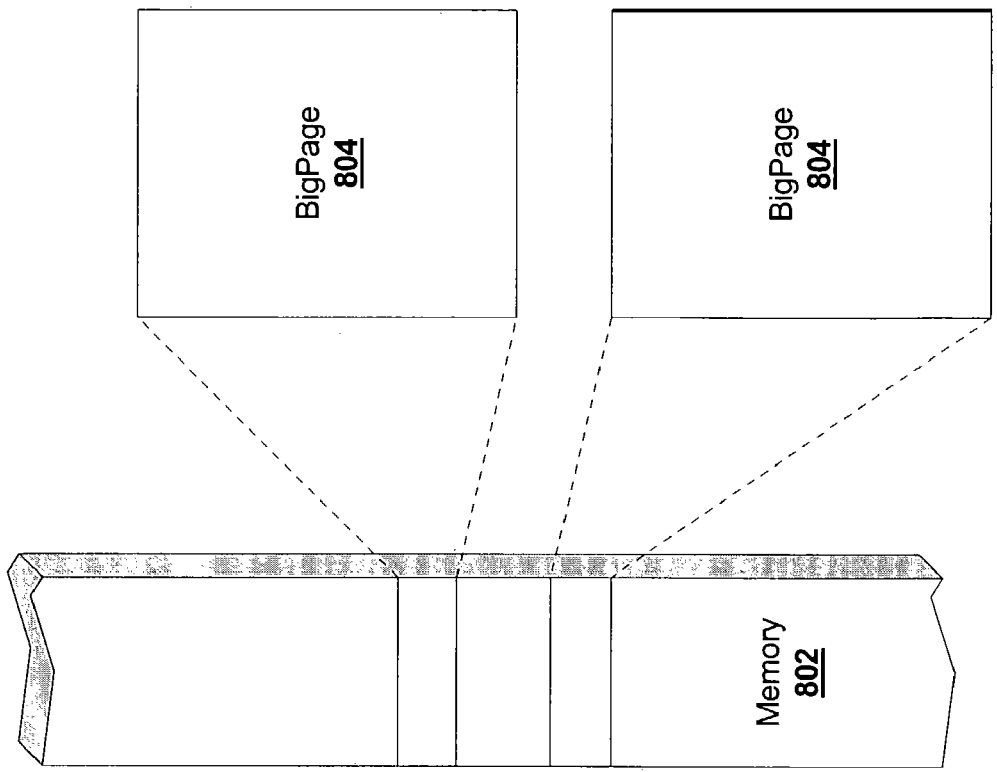

MEMORY MANAGEMENT FRAME HANDLER

CROSS-REFERENCE TO RELATED APPLICATIONS

This application is related to U.S. application Ser. No. 10/625,908 titled "MEMORY MANAGEMENT TILE OPTIMIZATION" which is being filed concurrently with this application.

TECHNICAL FIELD

This disclosure is directed to a memory management system.

BACKGROUND

Computer systems provide various resources for storing data, such as, for example, random access memory (RAM), read-only memory (ROM), hard disks, tapes, or optical drives. Some or all of a computer system's data storage resources may be provided to the operating system or to software applications. Memory management is the process by which these data storage resources are administered so that a software application may allocate and access those resources. When a software application relinquishes use of data storage resources, memory management may allow those resources to be reused by other software applications.

In a computer system, data storage resources are managed at three different levels: (1) at the hardware level; (2) at the operating system level; and (3) at the application level. At the hardware level, a computer system provides an interface to physical data storage devices that are a part of the computer system or that are coupled to the computer system. For example, hardware memory management may include providing an interface to physical RAM using a cache to improve access speeds. Hardware memory management provides an interface to data storage resources for an operating system.

At the operating system level, memory management exploits data storage resources provided by the hardware level to allow one or more software applications to access those data storage resources. At this level, the computer system may implement various features, such as, for example, virtual memory and data security. Virtual memory allows the computer system to surpass resource limitations of physical RAM using auxiliary data storage (e.g., hard drive). The data security features provided by operating systems allow each application to run independently of one another to prevent errors in one application (or malicious code) from adversely affecting other applications.

At the application level, software applications request memory from the operating system and manage the use of that memory in those software applications. Often, the memory management functions of a software application are provided by the programming environment used to create the application. For example, Java and C++ programming environments each provide an application level memory management system to provide efficient interaction with data storage resources in a wide variety of applications.

SUMMARY

In one general aspect, a frame handler for application-level memory management includes an associated block of memory divided into instances such that data elements may be stored in the instances, a data structure identifying the unused instances within the block of memory, and an application interface operable to receive a request for an unused instance from a software application. The frame handler is operable to identify an unused instance in response to a request received by the application interface.

In some implementations, the associated block of memory is divided into frames and the frames are divided into instances. The data structure may be represented as a tree, such as, for example, an AVL tree, with each node of the tree associated with a frame. In addition, each node is associated with a list of unused instances within the associated frame that may be represented as a ring structure.

To facilitate the identification of unused instances, the frame handler may include an anchor having an empty ring storing each node having no unused instances and a non-empty ring storing each node having unused instances. To allow the frame handler to allocate additional resources, the frame handler may include an operating system interface operable to allocate additional blocks of memory for use by the frame handler.

In another general aspect, a method for allocating memory in a computer system includes outputting a request from an application to an operating system for allocation of a block of memory by the operating system to the application, accessing the block of memory at the application, dividing the block of memory into frames, dividing each of the frames into instances, with each instance operable to store data and associated with an application-defined instance type, and maintaining a data structure indicating each unused instance.

Maintaining a data structure indicating each unused instance may include creating a node corresponding to each of the frames. To uniquely identify each frame, frames may be assigned frame identifiers for use by each node in identifying its associated frame.

In another general aspect, a first identifier that is associated with a first memory portion is assigned to a first node, and a first list of instances is linked to the first node, the first list of instances corresponding to divisions of the first memory portion. A second identifier that is associated with a second memory portion is assigned to a second node, and a second list of instances is linked to the second node, the second list of instances corresponding to divisions of the second memory portion. A data structure is constructed, using a plurality of nodes including the first node and the second node, and available instances are selected from the instances for data storage by an application, wherein the instances are associated with an application-determined instance type. The first memory portion may include a frame into which a block of memory allocated from the operating system is divided.

In some implementations, the data structure may include an AVL tree constructed using the plurality of nodes. In selecting available instances, the data structure may be traversed to locate the available instances.

Also, a linear list may be superposed over the data structure, wherein the linear list includes a first pointer to an empty subset of the plurality of nodes that has no associated memory available for use by the application and a second pointer to a not_empty subset that has associated memory available for use by the application. In this case, the first node may be a first not_empty node in the not_empty subset, and selecting available instances may include following the second pointer to the first node, and using the first list of instances as the available instances. Further in this case, the second pointer may be re-set to a second not_empty node in the not_empty subset, and the first node may be included in the empty subset.

In other implementations, an origin list from which the available instances were selected may be determined, and the available instances may be returned to the origin list. In this case, in determining the origin list, an identifier of the available instances may be matched to the first identifier or the second identifier. Further, in matching the identifier, a pointer may be followed to a first not_empty node of a not_empty subset of the plurality of nodes, the not_empty subset including not_empty nodes with associated memory available for use by the application.

The details of one or more implementations are set forth in the accompanying drawings and the description below. Other features and advantages will be apparent from the description and drawings, and from the claims.

DESCRIPTION OF DRAWINGS

FIG. 7 is a diagram of an InfoCell data structure.

FIG. 8 is a block diagram of memory under control of a memory management system with two BigPages allocated.

DETAILED DESCRIPTION

Figure 1:
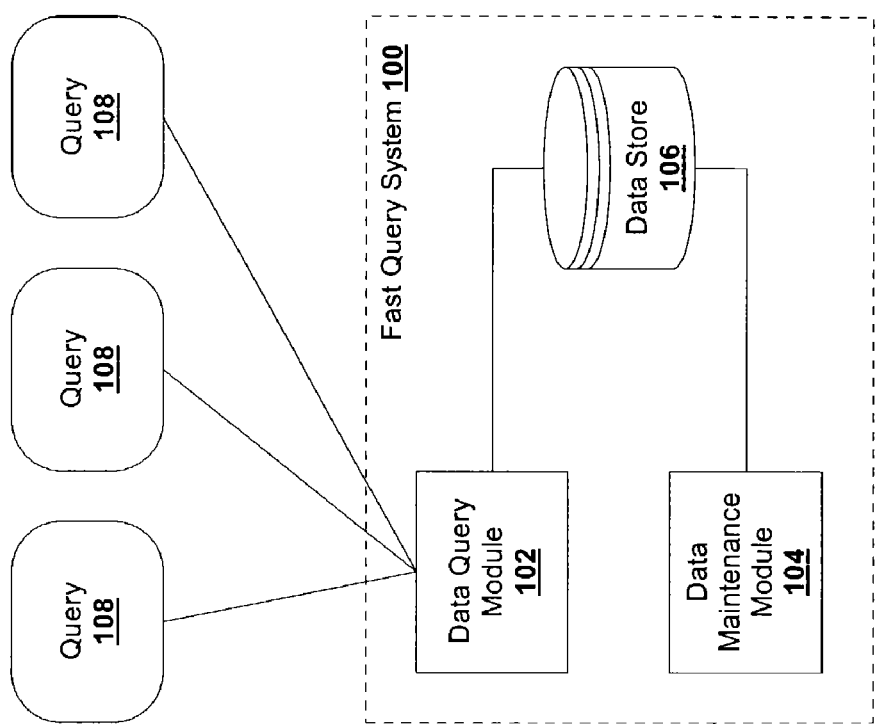
FIG. 1 is a block diagram of a data query system.

The application level memory management functionality provided by programming environments, such as, for example, C, C++, or Java, provide general-purpose support for a wide variety of applications. However, this one-size-fits-all approach cannot provide optimal memory management for all applications.

Some applications allocate large numbers of relatively small objects. For example, one implementation of a fast cache system provides a mechanism to query millions of data records very quickly, by creating complex data structures composed of many small data objects. In one example, a database of 5.3 million records is loaded into a fast cache system. Each record includes 10 attributes and the fast cache system indexes each of the 10 attributes, creating a node for each attribute in each record. Thus, 10 nodes are allocated for each of the 5.3 million data records, resulting in 53 million nodes that must be managed by the memory management system. There is a need for a memory management system that can efficiently allocate and manage large numbers of small objects for such applications.

An application level memory management system may be provided to more efficiently manage large numbers of small data objects by allocating one or more large blocks of data, subdividing each of the large blocks into multiple frames, and subdividing each of the frames to store multiple small data objects. To better describe this memory management technique, it is useful to first describe an application that may benefit from this design: a fast query system.

A data store is a collection of information encoded in a machine-based format, such as, for example, a database, a flat file, a spreadsheet, a file system, or any combination thereof. Applications may be provided to access a data store to search and retrieve the information (i.e., data) contained therein. Many business applications rely on data stores to store, search, and retrieve business data. As computation power increases, data store queries may bottleneck system performance. It is desirable to improve the performance of data store queries.

Information stored in a data store may be freeform, such as a text files, web pages, or articles, or it may be structured such as data records or XML files. Relational database management systems (RDBMS), such as Oracle, Sybase, DB2, SQL Server, and Informix, provide a mechanism for storing, searching, and retrieving structured data. For example, an RDBMS storing a customer list may facilitate searching and receiving customers records by fields such as name, company, or address. When fields are often used in data queries, the fields may be indexed in an RDBMS system to reduce the time needed to satisfy those queries. Indexing may reduce search times from linear time (e.g., searching each record for possible matches) to logarithmic time (e.g., using a tree-based indexing scheme) or to constant time (e.g., using a hash-based indexing scheme).

Freeform text search systems are sometimes implemented by creating structured data representing a freeform record. Then, structured data techniques may be applied to the freeform records. For example, a list of words in a web page may be used to create structured data linking the words to the web page. The structured data may be indexed and stored such that a user may perform queries to identify web pages containing a particular word.

In RDBMS systems, data records are typically organized into tables. Each table includes one or more data records and each data record includes one or more fields. For example, a customer table may include a data record for each customer with each data record including fields such as the following: customer number, first name, last name, address, and telephone number. The performance of an RDBMS system may be improved by indexing fields that are often used in queries. For example, if users often search for customer numbers and last names, those fields may be indexed to reduce the time it takes to satisfy such queries. For example, a B-tree index may be used to reduce the search time from linear time to logarithmic time. In a conventional data query system, the indexes typically are created and stored apart from the data that is indexed.

Referring to FIG. 1, a fast query system 100 includes a data query module 102, a data maintenance module 104, and a data store 106. The data query module 102 receives and processes queries 108. Data queries may be formulated in a proprietary query language, or in a standard query language such as the structured query language (SQL). The data maintenance module 104 may perform maintenance tasks such as data loads, backups, indexing, and optimization. The data maintenance module 104 may be used to load data from, for example, a flat file or RDBMS into the fast query system 100. Loaded data is stored in the data store 106 in a format to facilitate fast responses to queries as is described below with respect to FIGS. 2, 3, and 4A-4D.

In one implementation, the fast query system 100 receives a query 108 formulated in the SQL query language. The data query module 102 processes the query and returns data records from the data store 106 satisfying the query 108. For example, a business application may select all customer records corresponding to customers with a last name of "Smith" by sending the following query 108 to the fast query system 100:

SELECT*FROM Customer WHERE
Name="Smith".

Figure 2:
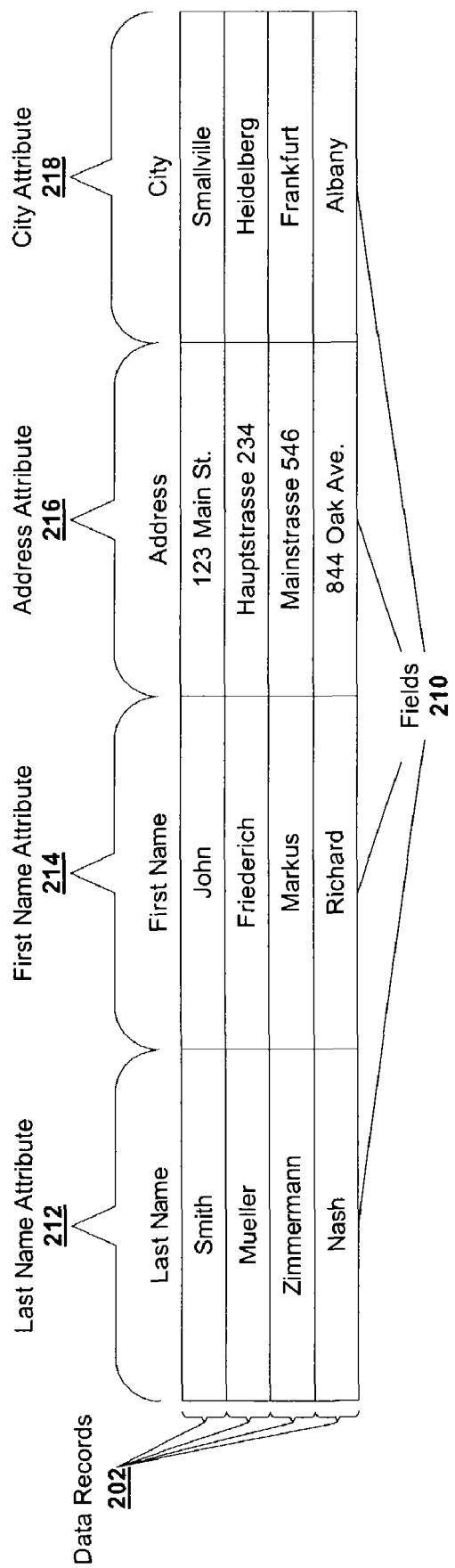
FIG. 2 is a diagram of a series of data records and their corresponding fields.

Referring to FIG. 2, the data store 106 maintains data in data structures to facilitate efficient search and retrieval. In a conventional RDBMS system, data is organized into tables with each table including data records 202 having one or more fields 210. In this example, each data record 202 includes a last name attribute 212, a first name attribute 214, an address attribute 216, and a city attribute 218. This data is maintained in the data store 106 in a tree structure. Each attribute is indexed to facilitate searching on a particular field 210 and each data record 202 is stored to facilitate retrieval of other fields 210 within a given data record 202.

Figure 3:
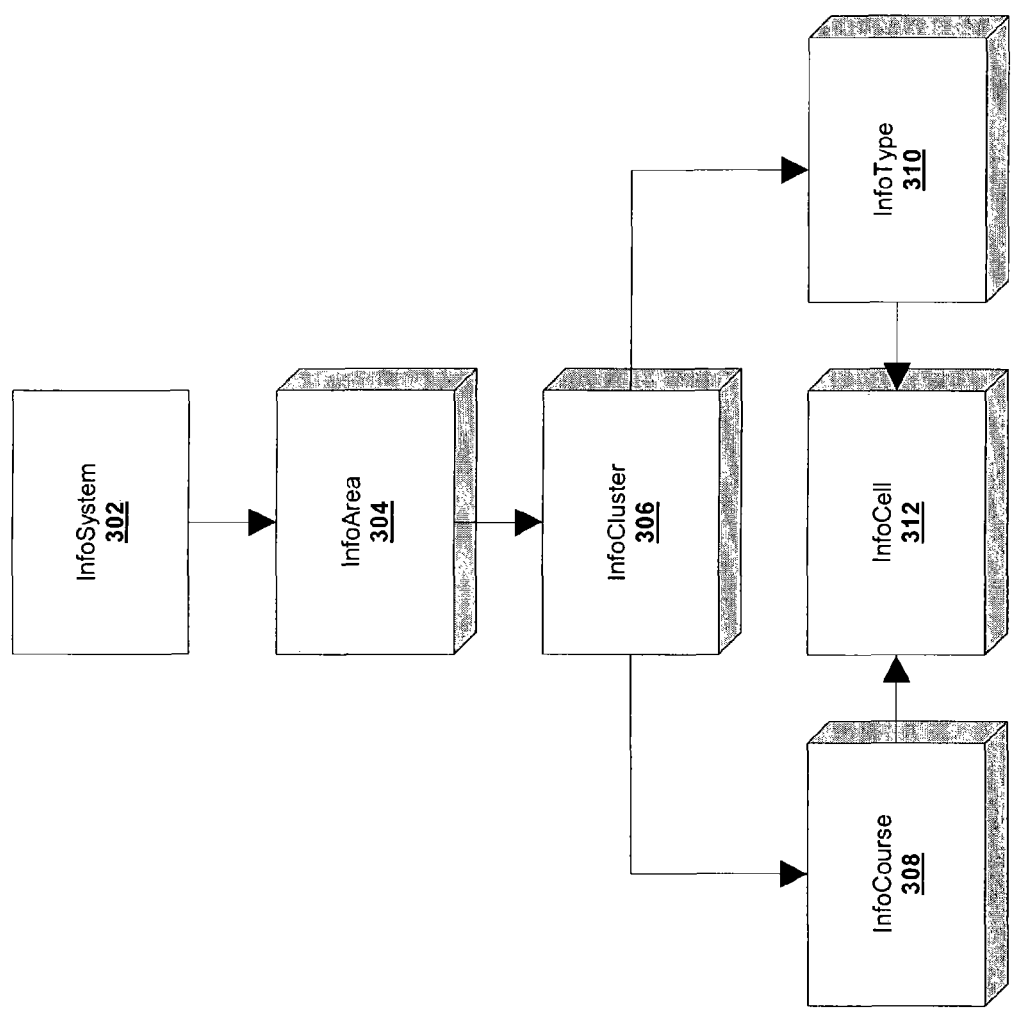
FIG. 3 is a block diagram of various data abstractions used in a fast query system to represent attributes and data records.
Figure 4A:
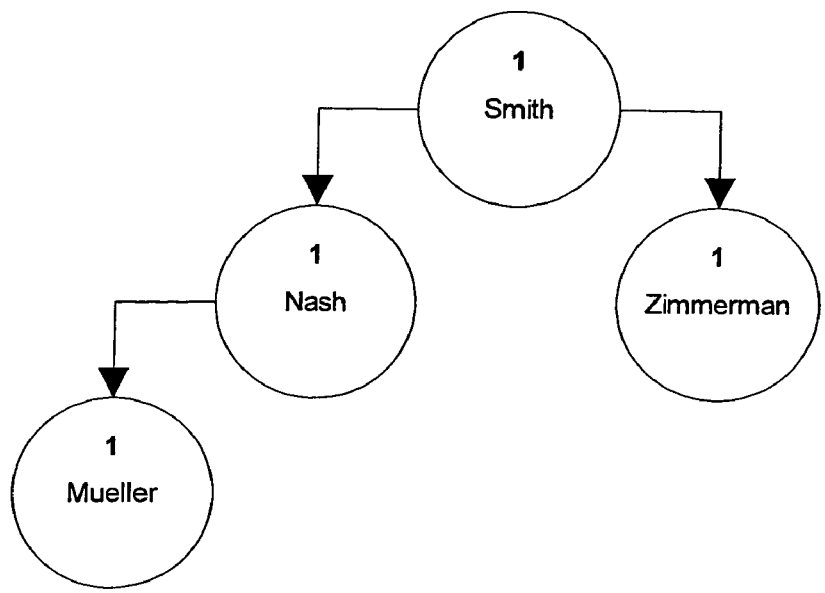
FIGS. 4A-4D are diagrams of InfoType tree structures indexing attributes within a fast query system.
Figure 4B:
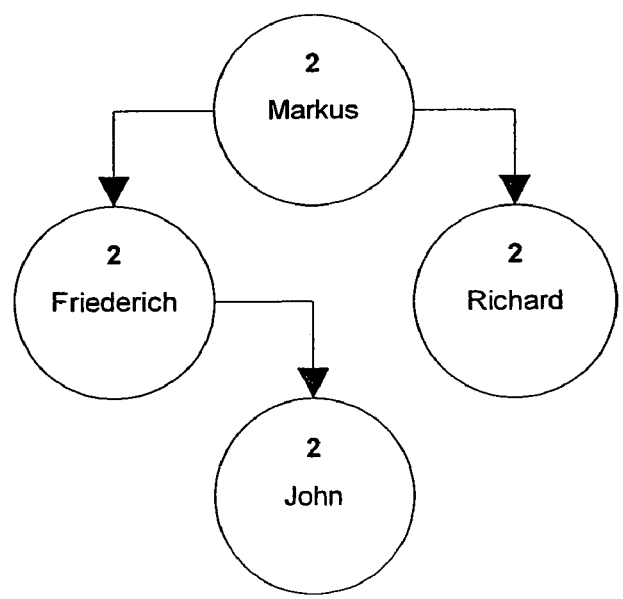
Figure 4C:
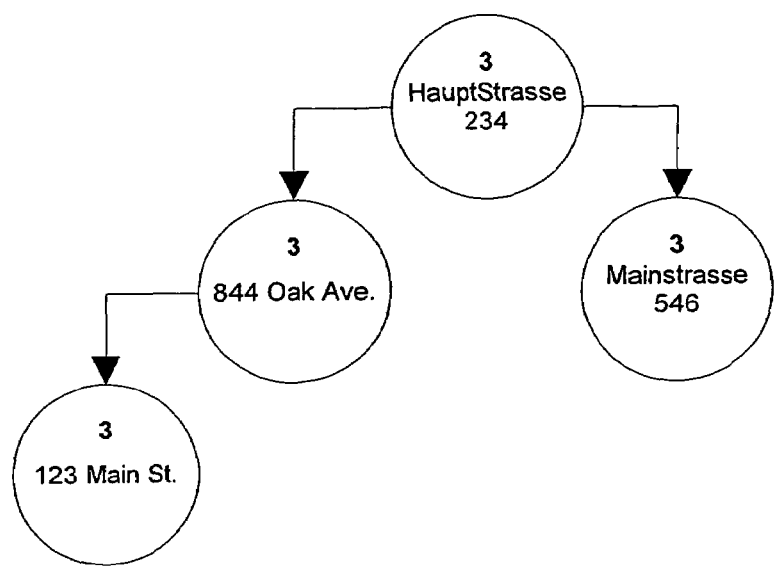
Figure 4D:
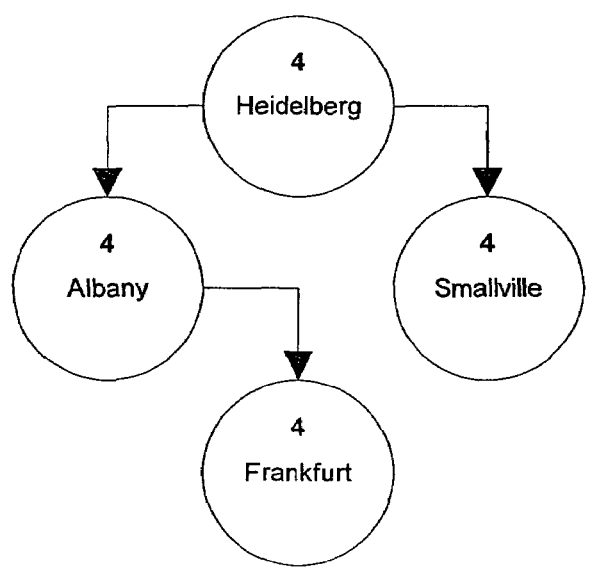

Referring to FIG. 3, in some implementations, the fast query system 100 is organized using the following abstractions. All data stored in a fast query system 100 is stored within an InfoSystem 302. The InfoSystem 302 roughly corresponds to an RDBMS system in a relational database model. Each InfoSystem 302 includes one or more InfoAreas 304. Each InfoArea 304 is roughly equivalent to a database in an RDBMS system. An InfoArea 304 includes one or more InfoClusters 306 which are similar to tables within an RDBMS system. An InfoCluster 306 includes one or more InfoCourses 308 and one or more InfoTypes 310 with InfoCourses 308 representing data records and InfoTypes 310 representing attributes within an InfoCluster 306. An individual field 210 in a data record 202 is represented by an InfoCell 312. Each InfoCell 312 appears in at least one InfoType 310 representing the data record 202 of the field 210 and at least one InfoCourse 308 representing an attribute corresponding to the data records 202.

In implementations having a single database, the InfoSystem 302 and InfoArea 304 are not necessary. In such systems, the InfoCluster 306 may serve as the highest-level abstraction within a fast query system 100.

Referring to FIGS. 4A-4D, InfoTypes 310 and InfoCourses 308 may be implemented using any indexing structure including tree structures or hash tables. For example, conventional balanced tree structures such as red-black trees and AVL trees may be used. FIGS. 4A-4D illustrate InfoTypes 310 using balanced binary trees used in an AVL index. In this example, each node within the InfoType 310 includes a left and right pointer. A node's left pointer identifies elements less than the node and a node's right pointer identifies elements greater than the node. For example, "Nash" is less than "Smith" and "Zimmerman" is greater than "Smith." The numbers on each node in FIGS. 4A-4D represent the node's InfoType 310. The number "1" represents the last name attribute 212, "2" represents the first name attribute 214, "3" represents the address attribute 216, and "4" represents the city attribute 218. Each attribute is represented by a corresponding InfoType 310.

Figure 5A:
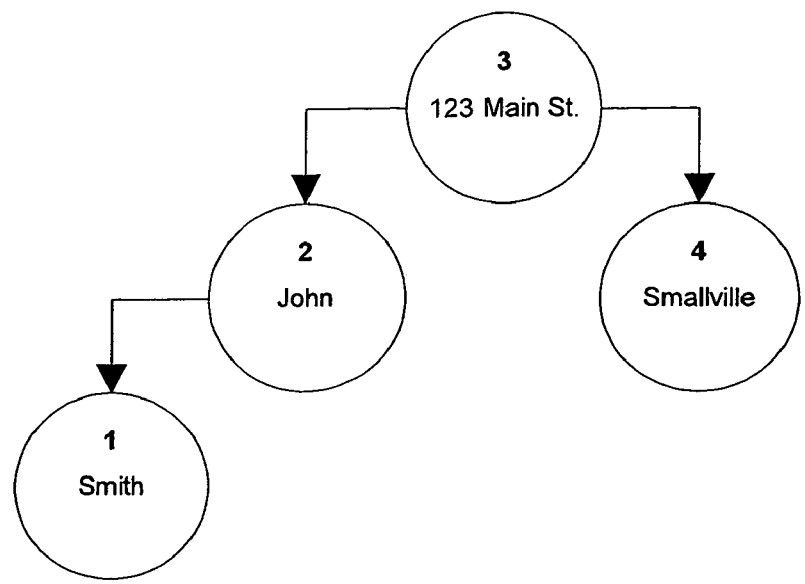
FIGS. 5A-5D are diagrams of InfoCourse tree structures indexing data records within a fast query system.
Figure 5B:
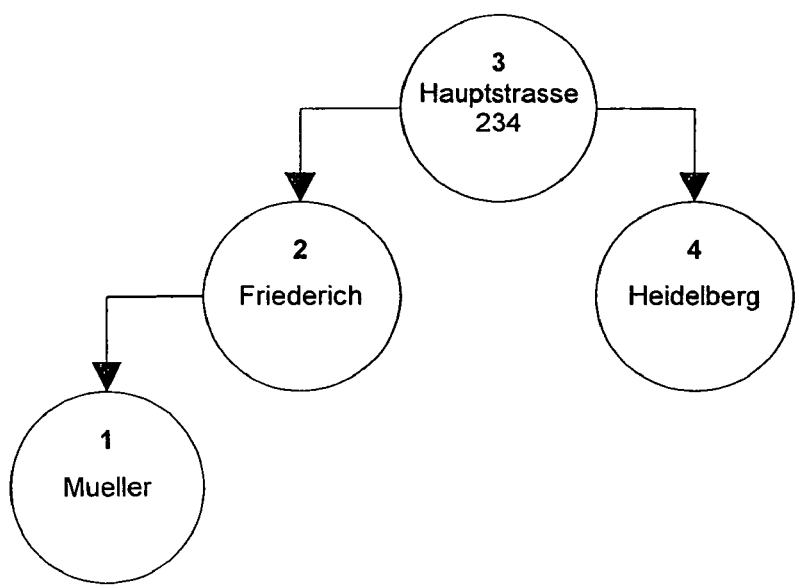
Figure 5C:
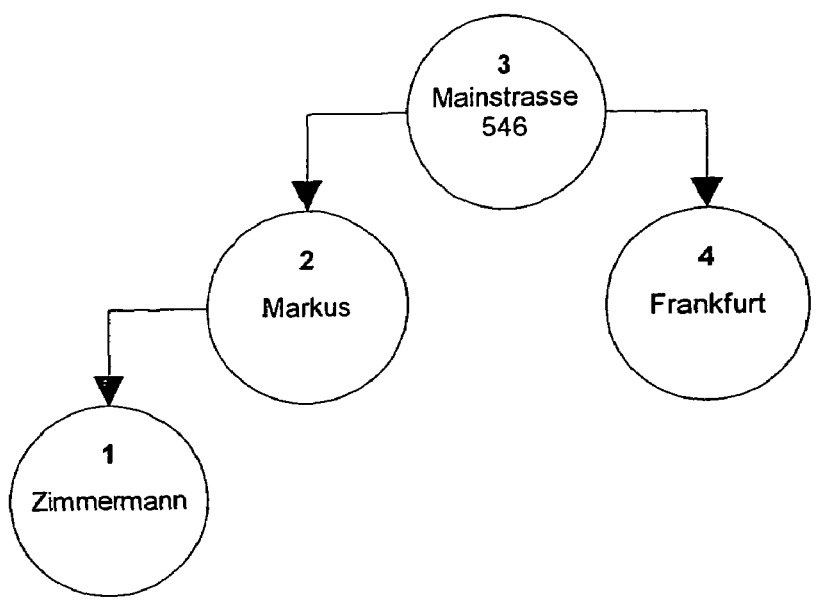
Figure 5D:
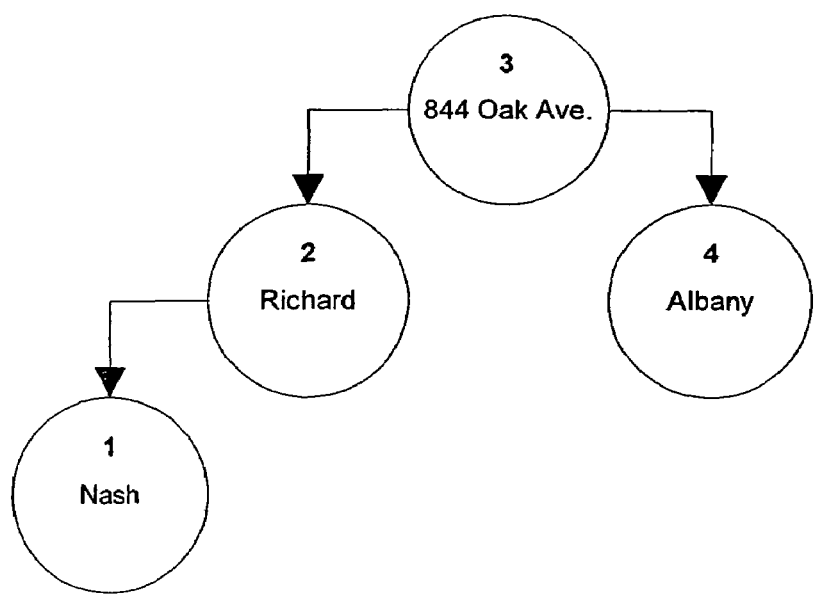

Referring to FIGS. 5A-5D, InfoCourses 308 represent data records 202 in a data query system 100. The fields 210 within a data record 202 may be indexed to facilitate retrieval of a specific field 210. For example, FIGS. 5A-5D show four AVL trees indexing fields 210 in an InfoCourse 308. Each field 210 is represented by an InfoCell 312. Alternatively, any other indexing technique may be used including, but not limited to, red-black trees, B-trees, or hash tables. In this example, an arbitrary number corresponding to an InfoType 310 is used to index the data record 202 within an InfoCourse 308. In FIG. 5A, the root node, numbered "3", stores the address attribute 216, "123 Main St." To its right is the city attribute 218, "Smallville," because its corresponding number "4" is greater than "3." To its left is the first name attribute 214, "John," with a corresponding number "2" less than "3." Finally, the last name attribute 212, "Smith," with a corresponding number "1" is to the left of the first name attribute 214.

Figure 6:
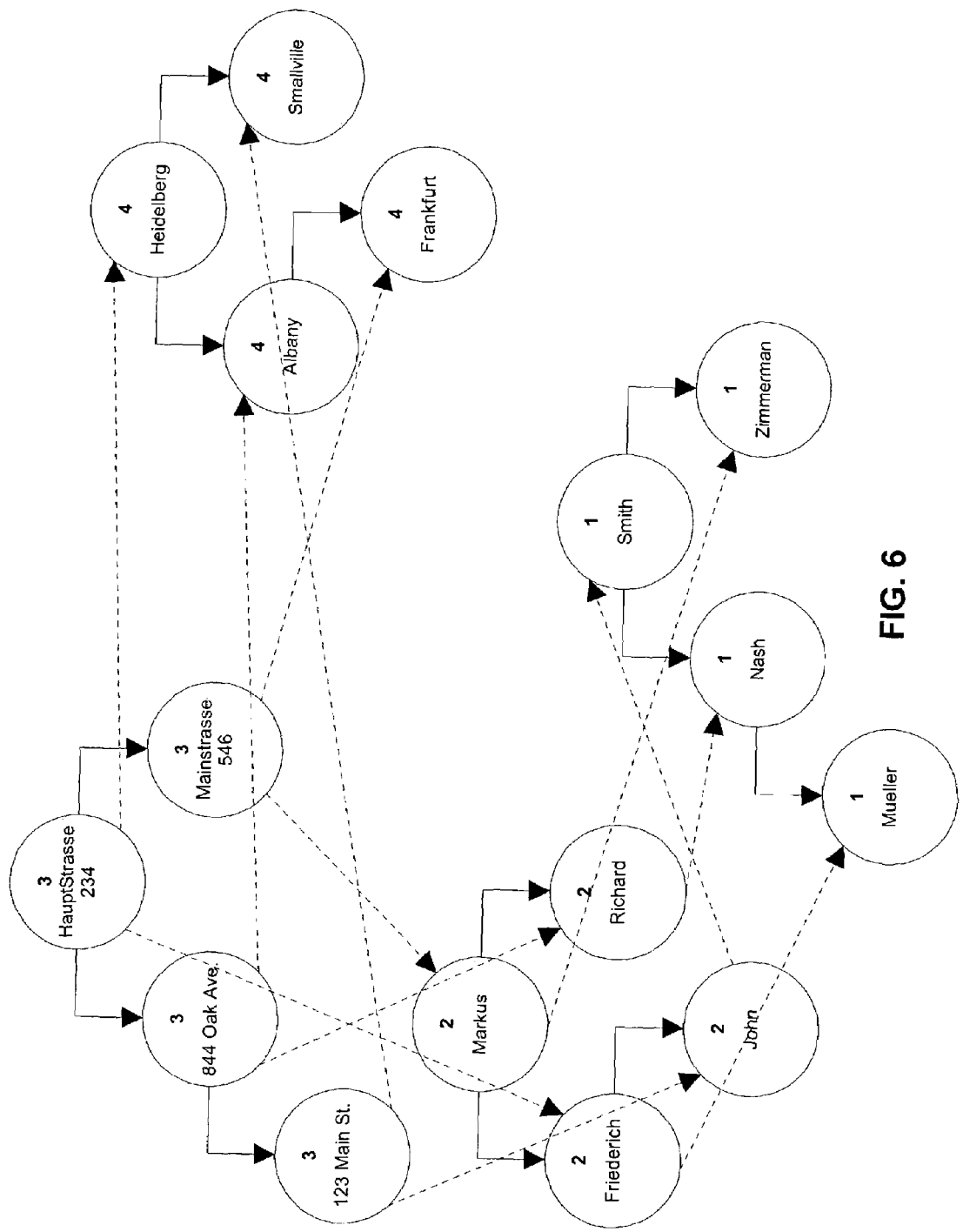
FIG. 6 is a diagram showing the relationships between InfoTypes and InfoCourses.

Referring to FIG. 6, the InfoCourse 308 and InfoType 310 data structures are integrated with one another to form an InfoCluster 306. Each node within the InfoType 310 and InfoCourse 308 data structures is represented by an InfoCell 312. This allows the system to traverse an InfoType 310 to quickly find data records 202 that satisfy a query and to traverse an InfoType 308 for a particular data record 202 to locate a desired field 210.

FIG. 7 shows an exemplary InfoCell 312 data structure that may be used by InfoCourses 308 and InfoTypes 310. The InfoCell 312 includes a left InfoType pointer 702 and a right InfoType pointer 704. These pointers are used to define an InfoType 310 tree structure. For example, in FIG. 4A the InfoCell 312 for the last name attribute 212 "Smith" includes a left InfoType pointer 702 to the "Nash" InfoCell 312 and a right InfoType pointer 704 to the "Zimmerman" InfoCell 312. Some InfoCell 312 data structures do not need a left InfoType pointer 702 or a right InfoType pointer 704. Blank InfoType pointers 702 or 704 may point to the null value or may reference an anchor node of the InfoType 310. An anchor node points to the root node of the InfoType 310 so the system may begin a tree traversal or so that the system may identify when the bottom of the tree has been reached. Additionally, the root node of the tree may be located by traversing the tree until the anchor node is reached. Similarly, a left InfoCourse pointer 712 and a right InfoCourse pointer 714 are used to define an InfoCourse 308 tree structure. Each InfoCourse 308 also may include an anchor node.

If more than one InfoCell 312 in an InfoType 310 are equivalent, then the equivalent InfoCells 312 are not less than or greater than each other and so may be represented in the same location in the InfoType 310 data structure. A left self ring pointer 722 and a right self ring pointer 724 may be used to represent each equivalent InfoCell 312 in an Info- Type 310 as a ring with InfoCell 312 in the InfoType 310 tree and the equivalents being linked to one another using the left self ring pointer 722 and right self ring pointer 724. Finally, data in an InfoCell 312 is stored in the data field 732.

This fast query application maintains an InfoCell 312 for each attribute value in each data record. To provide fast query functionality for a data store having 5.3 million records and each record having 10 attributes, this implementation of a fast query system stores 53 million InfoCell 312 data structures. The following application level memory management techniques provide efficient access to each of the 53 million data records.

Referring to FIG. 8, memory 802, managed by an operating system, is divided into one or more blocks called BigPages 804. Instead of applications allocating individual blocks of memory for each data object, applications may allocate BigPages 804 from the operating system and store multiple data objects on each BigPage 804, thus reducing the total number of data objects that must be allocated and maintained by the operating system. A BigPage 804 may be allocated in any size and then subdivided into frames for holding instances of data objects. For example, in a fast query system, 16 MB BigPages 804 may be used such that 64 BigPages 804 are needed to allocate 1 GB of storage space. In this implementation, BigPages 804 are allocated from the operating system and the allocated BigPages 804 are used to store individual frames and instances so that individual frames and instances do not need to be individually allocated and managed by the operating system.

In some implementations, it may be desirable to use a smaller BigPage 804, a larger BigPage 804, or to use variable-size BigPages 804. As described below, some applications may improve memory management performance by only storing a single data type in a BigPage 804. If a large number of data types are used, with less-than 16 MB storage required for each data type, it may be beneficial to use a smaller BigPage 804 size, such as, for example, 1 MB, 2 MB, 4 MB, or 8 MB. Similarly, some applications may benefit from a larger BigPage 804 size, such as, for example, 32 MB, 64 MB, or 1 GB. Finally, variable-sized BigPages 804 may be used to optimize memory management for a particular application.

In some implementations, the size of BigPages 804 is set in software by a coding parameter. Unless an application changes this coding parameter, BigPages 804 are allocated using a default size. If larger or smaller sizes are desired, the system may change the coding parameter to specify a new size.

Figures 9, 10:
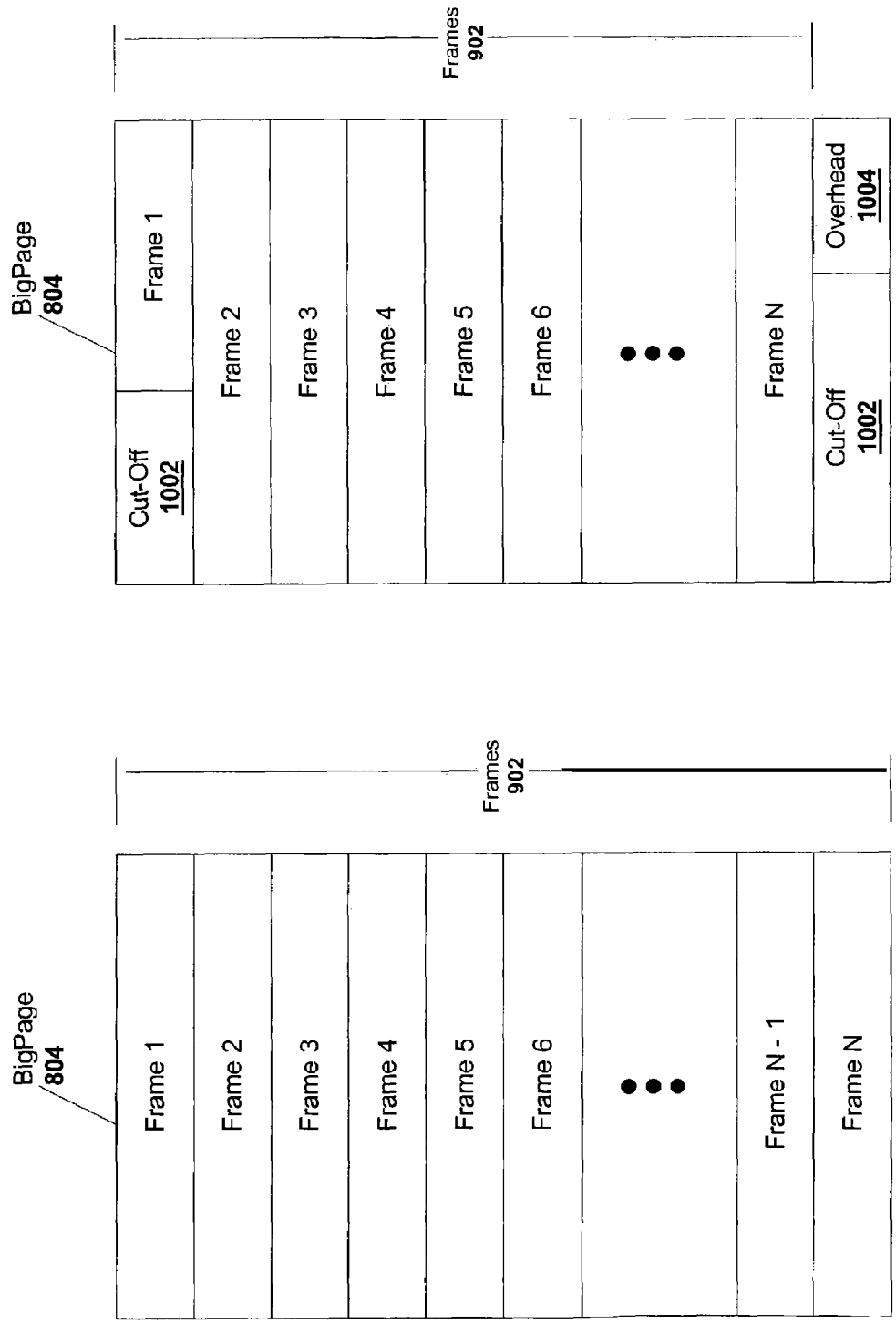
FIG. 9 is a block diagram of a BigPage divided into frames for storing multiple small data objects.
FIG. 10 is a block diagram of a BigPage with cut-off at the beginning and end so that frames do not cross page boundaries.

Referring to FIG. 9, a BigPage 804 is divided into various frames 902, which are used to store individual data elements. In this implementation, a BigPage 804 is divided into N frames 902. Operating systems implementing virtual memory divide memory into pages of a predetermined size that may be paged in or paged out of main memory. So that an entire frame will be either paged in or paged out at the same time, frames may be arranged to coincide with pages in the underlying operating system and hardware platform. For example, in an operating system using 4 kilobyte (KB) pages, each BigPage 804 may be divided into 4 KB frames 902 such that frames may be paged in and paged out as a whole by the underlying operating system.

In one implementation, a 16 MB BigPage 804 is used in a computer system with a 8 KB page size. The BigPage 804 may be divided into 8 KB frames 902 to create 2,048 frames 902. These frames, in turn, may be used to store data. Similarly to BigPage 804 sizes, frames 902 may be sized using a coding parameter to allow applications to adjust the size of a frame 902 based on a particular application. Typically, the size of a frame 902 is chosen such that there are a relatively large number of frames in each BigPage 804; however, any size frames may be used.

Referring to FIG. 10, frames 902 may be sized such that they are the same size as pages used by the underlying operating system as discussed above with reference to FIG. 9. In some operating systems, a BigPage 804 may be allocated such that it begins on a page boundary. If the BigPage 804 begins on a page boundary and each frame 902 is the same size as a page, then each frame 902 will coincide with a frame such that the frame 902 is either paged in or paged out.

Some operating systems do not provide the capability to allocate a block of memory beginning on a page boundary. To improve these memory management techniques in these operating systems, the application-level memory management system may begin the first frame 902 at the beginning of the first memory page entirely within the BigPage 804, leaving a portion of the BigPage 804 unused. This unused memory, designated cut-off 1002, is less than the size of a single frame 902.

In addition to the cut-off 1002 at the beginning of a BigPage 804, there may be memory left at the end of the BigPage 804 that is too small for a frame 902. This space also may be designated as cut-off 1002. If the BigPage 804 is chosen to be a multiple of the size of each frame 902, then the BigPage 804 may be divided into N frames, where N is the size of the BigPage 804 divided by the size of the frame 902, if the BigPage 804 begins on a memory page boundary. If the BigPage 804 begins outside of a memory page boundary, the system designates a cut-off 1002 at the beginning and the end of the BigPage 804. The cut-off 1002 at the beginning and end of the BigPage 804 would form an additional frame 902 if combined together, thus only (N−1) frames 902 are available.

In some operating systems, additional data storage is needed to store various administrative data. This allocator memory overhead 1004 may be appended onto the end of the BigPage 804 or it may be stored within the BigPage 804 in memory that would otherwise be designated as cut-off 1002. FIG. 10 shows an implementation with the overhead 1004 included within the BigPage 804.

The cut-off 1002 at the beginning and end of a BigPage 804 resides outside of memory pages storing data. Thus, the pages containing the cut-off 1002 (and the overhead 1004) will eventually be paged out so that they do not take up physical memory that could adversely impact overall system performance.

Figure 11:
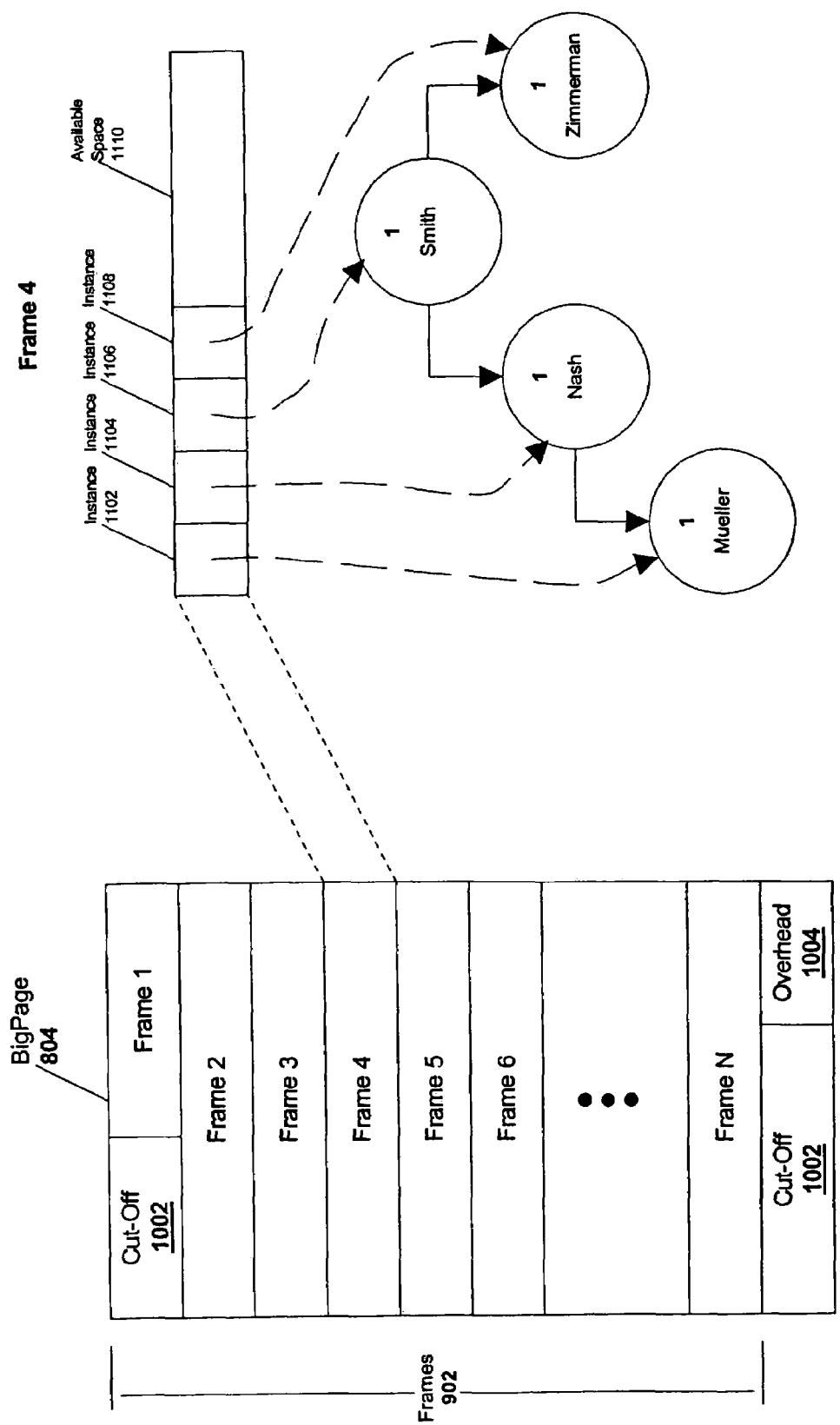
FIG. 11 is a block diagram of various data objects stored in a frame.

Referring to FIG. 11, each frame 902 may be further divided to store instances (1102, 1104, 1106, and 1108) of a particular data type. In this example, an InfoType 310, from the example discussed with reference to FIGS. 4A-4D, is an AVL tree storing an attribute from a group of data records. Each node in the AVL tree is an instance of an InfoCell 312 (as shown in FIG. 7). These InfoCells 312 are stored in portions of a frame 902 within a BigPage 804.

In this example, an InfoCell 312 representing an attribute of a data record having the value "Mueller" is stored in instance 1102 of frame 4, an attribute having the value "Nash" is stored in instance 1104, an attribute having the value "Smith" is stored in instance 1106, and an attribute having the value "Zimmerman" is stored in instance 1108. Because each of these instances is stored within a BigPage 804, it is unnecessary to consume overhead 1004 for each of the objects. Additional data may be stored in the remaining available space 1110.

In some implementations, only instances of a single type, such as for example, instances of the same data type or same class, are stored in a single BigPage 804. This simplifies the administration of a BigPage 804 since each instance in each frame 902 is the same size. Additionally, instances 1102, 1104, 1106, and 1108 make up a single AVL tree used by the fast query system 100 of FIG. 1. When the fast query system 100 traverses the tree to satisfy a query, the nodes within the tree are likely to be used in close temporal proximity. By storing nodes of a single type on one BigPage 804 or a few BigPages 804, the system may be able to maintain spatial proximity of the data. This design may reduce the system page rate if physical memory is insufficient and the operating system begins to page out memory.

Additionally, by only using instances of a single type within a BigPage 804, resources may be more easily returned to the operating system for later use or for use by another application when all instances of a single type are deleted. However, if a BigPage 804 contains many instances of one type and a single instance of another type, the BigPage 804 may not be returned to the operating system when the many instances of the first type are deleted—the system must wait until the single instance is no longer needed before reclaiming the BigPage 804.

Without using these techniques, an application may store an instance by allocating storage space for that instance and storing the instance in the allocated space. This results in unnecessary overhead in identifying the type of the instance and other administrative information. Alternatively, using the techniques described above, the application may store an instance by determining if space is available in a frame 902 of a BigPage 804 for storing the corresponding type of data. If space is available, the system stores the instance. If space is not available, the system may allocate another BigPage 804 from the operating system and store the instance in one of its fields.

Figure 12:
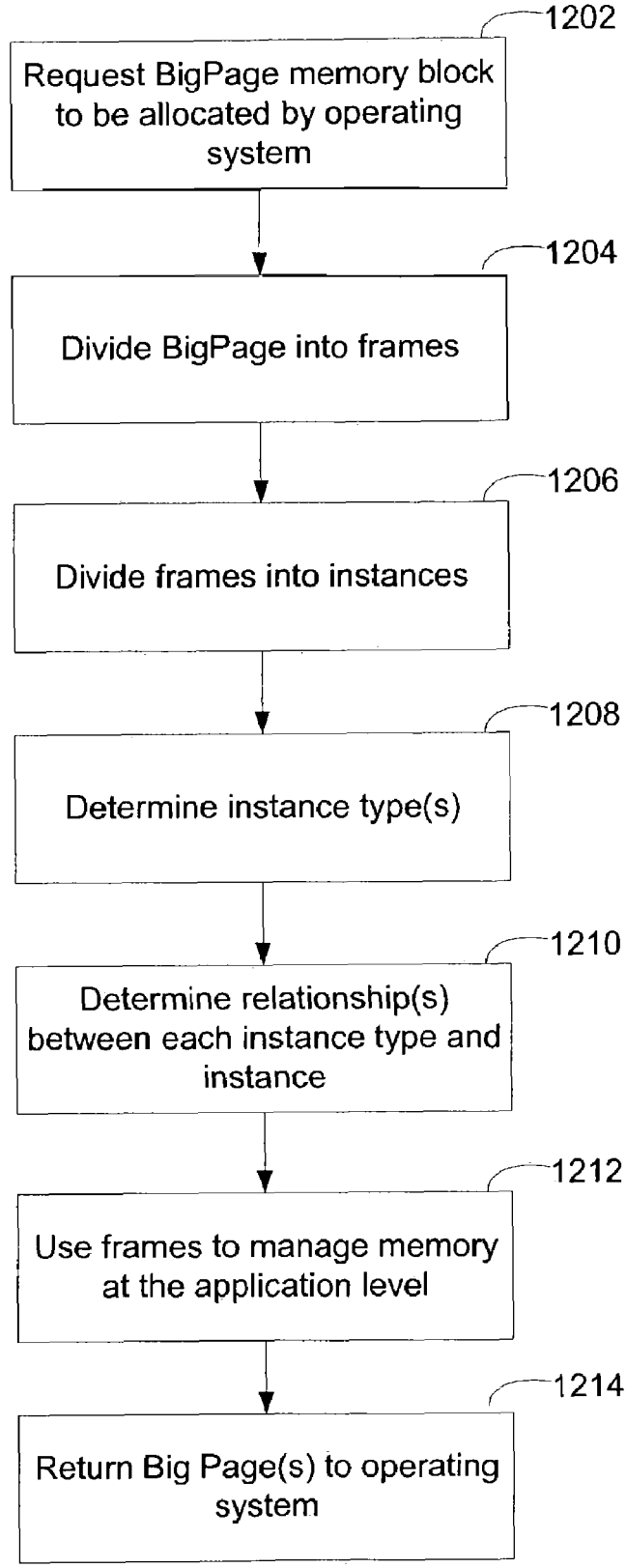
FIG. 12 is a flow chart illustrating allocation and use of a BigPage.

FIG. 12 is a flow chart 1200 illustrating allocation and use of a BigPage. In FIG. 12, an application such as the fast query system 100 requests allocation of a BigPage memory block from its operating system (1202). As discussed above, this allocation relieves the operating system of the burden of managing many instances/objects individually by only requiring that the operating system be responsible for managing the relatively smaller number of BigPages.

Next, the application divides the BigPage(s) into individual frames (1204), and divides the individual frames into instances (1206). The application may then determine instance types (1208), or, more generally, the application may have already determined various instance types at some previous point in time. For example, in the example of FIG. 11, the fast query system 100 determines (or has determined) an InfoType making up a specific AVL tree in which last names of customers are stored.

Based on the above, the application is able to determine a relationship between each instance type(s) and the various instances of the frames (1210). That is, it should be understood that it is generally the application, not the operating system, which has specific knowledge as to how instance types are defined, organized, and/or related to other instance types. Further, as in the examples discussed above, the application has knowledge as to which instances are temporally or spatially related to one another. Therefore, the application is well-suited to ensure that, generally speaking, instance types are optimally organized for storage in (and removal from) selected instances of selected frames.

The application proceeds to use the frames to manage memory during execution of the application (1212). For example, the fast query system 100 may use data from the frames to access customer data and respond to queries about those customers. Since the application is able to define and store related data in related instances (i.e., instances of a particular frame or BigPage), access to the customer data from the frames is facilitated.

When the fast query system 100 or other application is finished responding to queries regarding the customer database, it may return the BigPage(s) to the operating system (1214). Specifically, to the extent that the application has only stored related data in the frames, e.g., data of a single instance type, it is likely that an application may relinquish data from an entire BigPage at once, so that the BigPage may be returned to the operating system quickly and efficiently. That is, a scenario in which an application cannot return any of an entire BigPage, merely because a small portion thereof is required to store a single instance type, is avoided.

In returning the BigPage(s) to the operating system (1214), it should be understood that the application need not return a BigPage immediately upon a determination that it is no longer needed. For example, the application may retain access to a pool or buffer of BigPages for some predetermined period of time before actually releasing them to the operating system. In this way, particularly when a relatively large number of BigPages being used is in flux, the processes of allocating BigPages from (and returning BigPages to) the operating system may be minimized, since the application may be able merely to access the buffer for BigPages, as needed. Examples of techniques for returning BigPages to the operating system are discussed in more detail below, with respect to FIG. 22.

Figure 13:
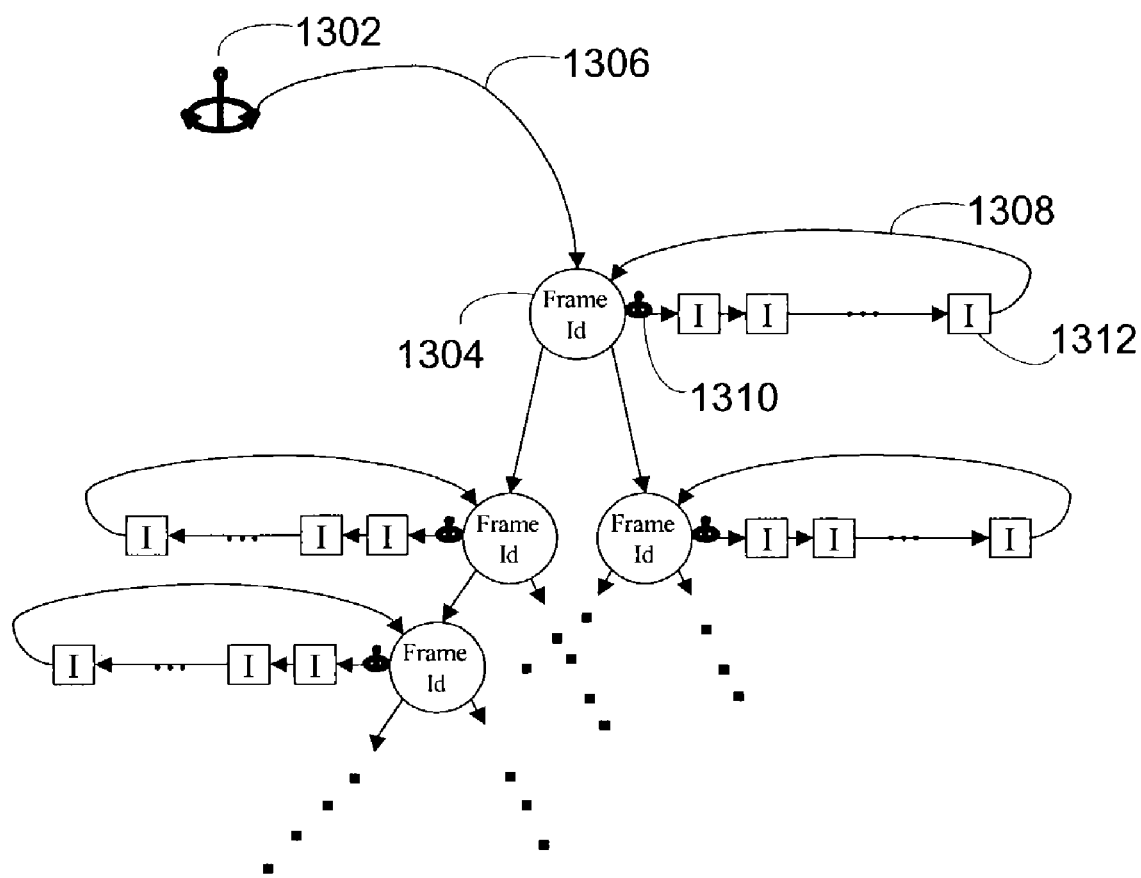
FIG. 13 is a block diagram of a frame handler with all instances available.

FIG. 13 is a block diagram of a frame handler 1300 with all instances available. As discussed in more detail below, the frame handler 1300 is designed to provide an interface between the data storage techniques discussed above and a software application.

More specifically, the above description of FIGS. 1-12 describe techniques by which an application such as the fast query system 100 of FIG. 1 may allocate and manage memory from an operating system by dividing allocated BigPages into frames that are further divided into instances. In order to utilize these instances, however, the application may require techniques for locating and obtaining instances that are available for use by the application, from among all of the instances that have been created as a result of BigPage/frame allocation. Similarly, the application may require the ability to efficiently relinquish instances once they are no longer required for use.

The frame handler 1300 implements these and other functions by handling instances of one specific type, and keeping track of the available space 1110 in each managed frame 902. For example, the frame handler 1300 may be used to handle all instantiations of the class InfoCell 312. Other frame handlers, of course, may be used to interface(s) between the application and instances of other instance types.

The frame handler 1300 includes an anchor node 1302 that is connected to a node 1304 by a pointer 1306. The node 1304 represents a particular frame 902, and is uniquely associated with such a frame by virtue of a frame identifier (frame ID). A ring structure 1308 is associated with, and attached to, the node 1304 by way of an anchor node 1310. The ring structure 1308 includes instances 1312 into which the identified frame is divided for data storage, as described above. More specifically, the ring structure 1308 includes a pointer to each available instance 1312 within the frame 902 corresponding to the frame node 1304, so as to identify instances that are available for use by an application such as the fast query system 100 of FIG. 1.

In the example of FIG. 13, other frames are similarly assigned a frame ID and included in the frame handler 1300, so that a balanced binary tree, such as an AVL tree, is formed. The AVL tree of the frame handler 1300 is thus similar in form to the AVL tree described above with respect to the AVL trees of FIGS. 4A-4D, 5A-5D, and 6 that are used in the fast query system 100. Other data structures besides an AVL tree also may be used in constructing a frame handler such as the frame handler 1300.

It should be understood from FIG. 13 and following figures that merely a small portion of such an AVL tree is illustrated, for sake of clarity. Of course, the AVL tree may extend to various sizes, as needed, as indicated by the dotted lines shown in FIG. 13 and following figures. Typically, although not illustrated in FIG. 13, any node of the frame handler that does not have at least two child nodes will have a link directly back to the anchor node 1302.

In FIG. 13, the various frames represented in the frame handler 1300 by the respective frame IDs need not reside on a single BigPage, but rather may be associated with multiple BigPages. In this way, frames may be indexed within and across BigPages for easy access and use, as described in more detail below.

In the frame handler 1300, the frame ID of the node 1304 may be specified using any technique such that the frame ID may identify a particular frame 902. In some implementations, a 64-bit frame ID is used with the first 51 bits used to identify a particular frame. The remaining 13 bits address specific instances within the frame 902. This allows the frame ID to identify 2^51 different frames, and to address any location within a 8 KB frame. If a 4 KB frame size is used, then 12 bits would be sufficient to address any byte within the frame and 52 bits could be used to identify frames. This frame ID format allows instances within a frame 902 to be addressed relative to the frame using a 13-bit address or directly using a 64-bit address.

In FIG. 13, all of the illustrated frame nodes show available instances such as the instances 1312. That is, the frame nodes correspond to frames having instances that are not currently in use by a corresponding application, so that the application may access and use these instances on an as-needed basis. Such a situation may occur, for example, when the frame handler 1300 is first constructed (and associated frames and/or BigPage(s) are first allocated from an operating system), or before frames/BigPage(s) are returned to the operating system.

As time passes, however, and during normal operation of the associated application, it is typically the case that instances of one or more frames of the frame handler 1300 are put into use by the application. Thus, FIG. 14 illustrates a block diagram of the frame handler 1300 with some instances being used by the application.

Figure 14:
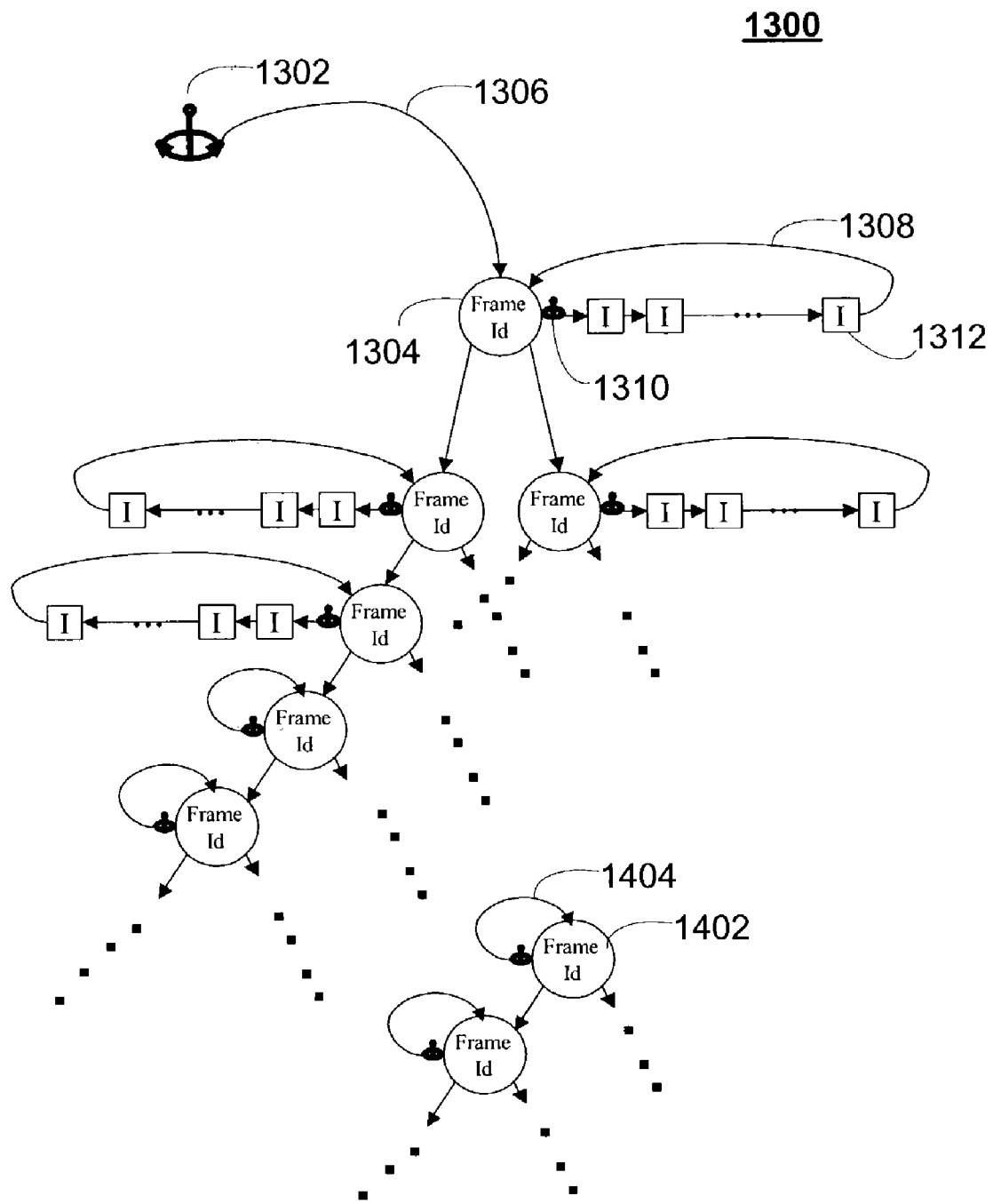
FIG. 14 is a block diagram of a frame handler with some instances being used by an application.

Specifically, in FIG. 14, a node 1402 contained somewhere within the frame handler 1300 represents a frame that is empty of available instances, i.e., all instances of the frame are being used by the application. In this case, a pointer ring 1404 may be used to indicate the lack of available instances of the frame associated with the node 1402. That is, the pointer ring 1404 corresponds to a pointer ring such as the ring 1308 after all of its corresponding instances (e.g., instances 1312) have been accessed for their use in storing data.

In operation, then, the application associated with the frame handler 1300 may locate instances for use in data storage simply by following the indexed-tree structure of the frame handler 1300. That is, the application may follow the pointer 1306 and continue descending the tree structure until a node associated with a non-empty frame (i.e., a frame with available instances) is located. Similarly, once an application no longer requires a particular instance, the application may descend the tree until a frame associated with that instance is found, and may then return the instance to the appropriate frame.

In cases where descending the tree structure does not yield a frame with available instances (e.g., the application is currently using all instances of a particular type, so that all of the frames associated with that instance type are empty), the application may allocate an additional BigPage(s) to gain more storage, as needed. In this case, the frames and instances of the new BigPage(s) may be added to the structure of the frame handler 1300.

Figure 15:
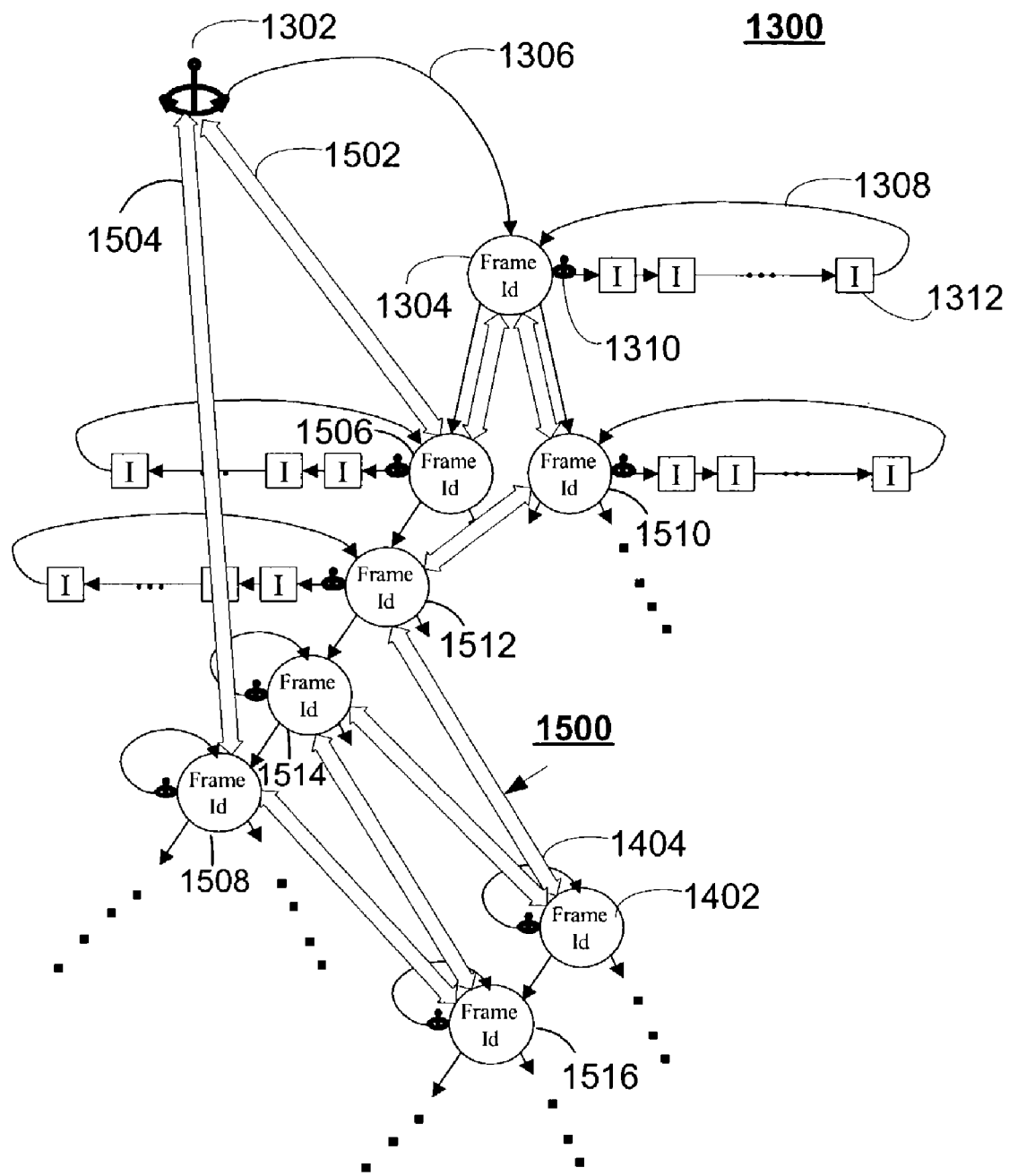
FIG. 15 is a block diagram of a frame handler including a pointer ring superposed over the frame handler.

FIG. 15 is a block diagram of the frame handler 1300 including a pointer ring 1500 superposed over the frame handler. The pointer ring 1500 of FIG. 15 is illustrated by double arrows overlying the tree structure of the frame handler 1300. Specifically, a first pointer 1502 represents a "not_empty" or "available" pointer that points from the anchor node 1302 directly to the first node of the frame handler 1300 that currently has instances available for use by the application. Conversely, a second pointer 1504 represents an "empty" or "none_available" pointer that points from the anchor node 1302 to the first node (or last node, depending on direction) that has all of its associated instances currently being used by the associated application.

In FIG. 15, it is shown for the sake of example that the not_empty pointer 1502 points directly to a first node 1506 with available instance resources, while the empty pointer 1504 points to a node 1508 having no currently available instance resources. The empty/not_empty pointer ring 1500 is superposed over the tree structure, defining a linear list of the anchor 1302, the node 1506, the node 1304, a node 1510, a node 1512, the node 1402, a node 1514, a node 1516, and the node 1508, before returning to the anchor node 1302.

Figure 16:
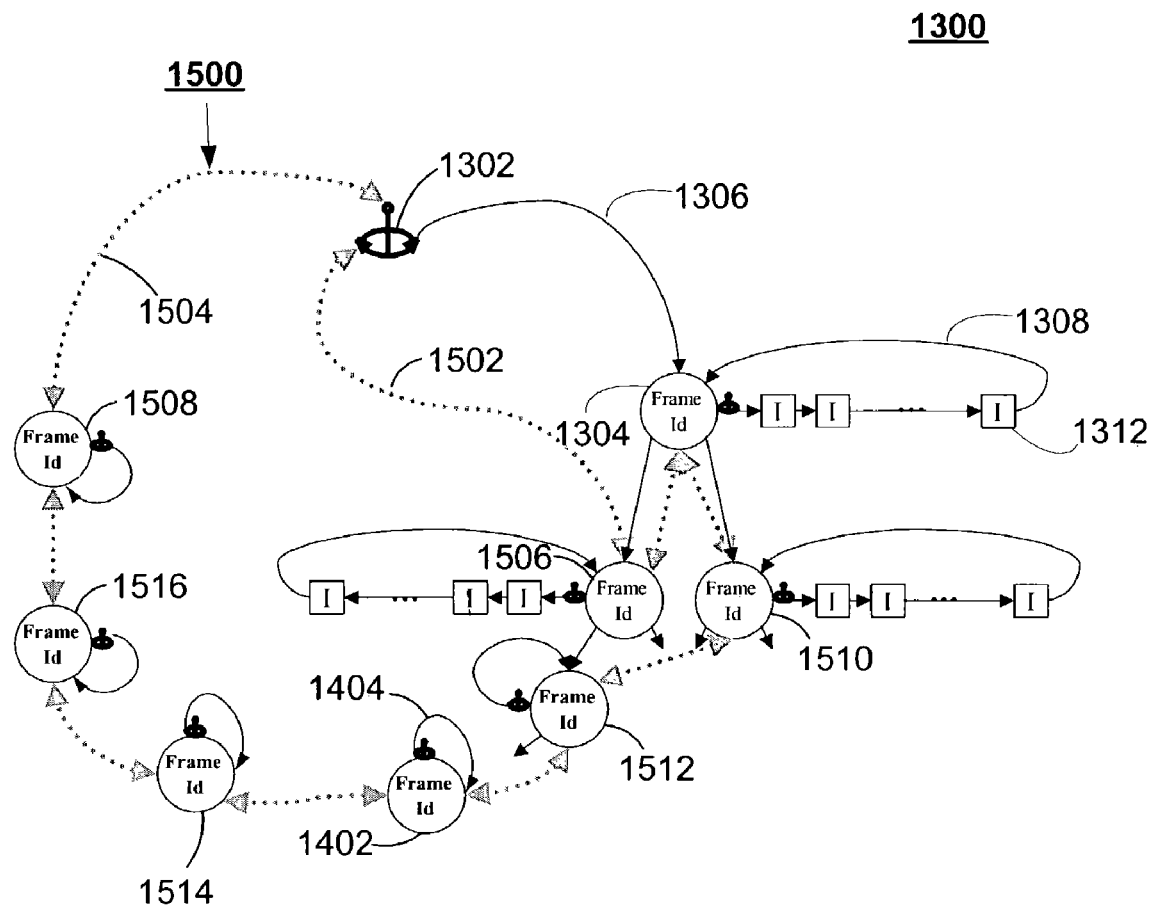
FIG. 16 is a block diagram of a conceptualization of the frame handler and pointer ring of FIG. 15.

FIG. 16 is a block diagram of a conceptualization of the frame handler 1300 and pointer ring 1500 of FIG. 15. More specifically, FIG. 16 illustrates a nature of the empty/not_empty linear list 1500 using a ring of dotted lines. The purpose of FIG. 16 is to illustrate a conceptual nature of the structure of the empty/not_empty ring 1500 apart from the tree structure of the frame handler 1300. However, it should be understood from FIG. 15 that the ring 1500 is not separate from, or outside of, the tree structure, but rather is superposed over the tree structure.

As discussed in more detail below, the ring 1500 provides direct access (e.g., a single step) to frame node(s) with available instances, and obviates the need to descend the tree structure (which, in many cases, may require many steps to descend the tree before a node with available instances is located). This ability and resulting increase in efficiency may be particularly advantageous in cases where large numbers of instances are to be fetched (and/or returned) from the frame handler 1300.

Figure 17:
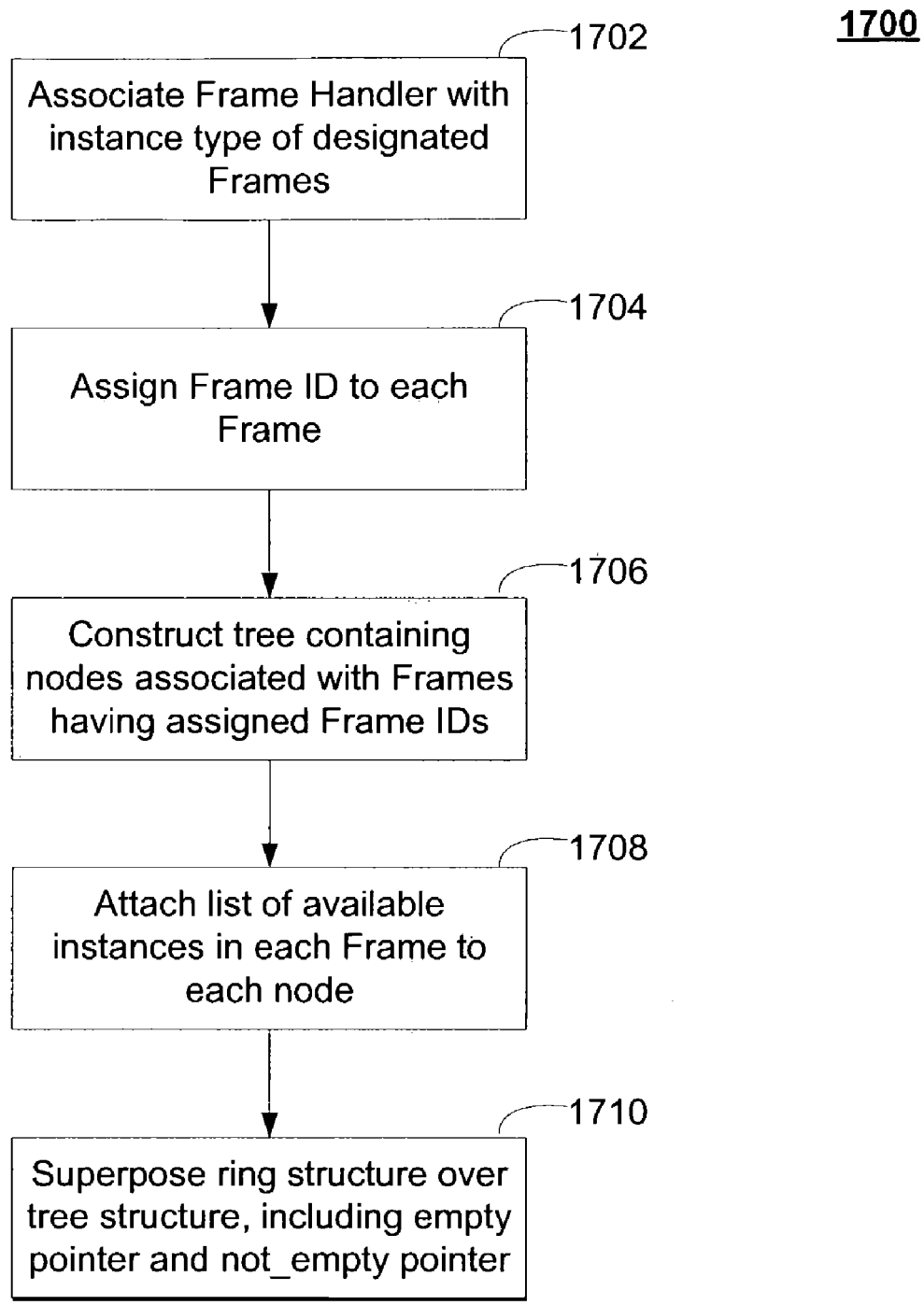
FIG. 17 is a flowchart illustrating construction of a frame handler and pointer ring.

FIG. 17 is a flowchart 1700 illustrating construction of the frame handler 1300 and pointer ring 1500, as discussed above. In FIG. 17, a frame handler is defined by associating the frame handler with a particular instance type to be stored in certain frames (1702). Then, a frame ID is assigned to each of the frames (1704), and a data structure such as a tree structure is constructed that includes nodes that are associated with the frames by way of a one-to-one correspondence between the nodes, frames, and frame IDs (1706).

A list of available, i.e., not currently used, instances in each frame is attached to each node (1708), using, for example, the pointer ring 1308. In this way, the frame handler 1300 is available for locating, using, and returning instances to and from their respective frames.

Additionally, a ring structure such as the ring 1500 may be defined and superposed over the tree structure of the frame handler (1710), including an empty pointer such as the empty pointer 1504 pointing directly to an empty node (i.e., one with no available instances) and the not_empty pointer 1502 pointing directly to a non-empty node (i.e., one with available or not-used instances). The ring structure facilitates an ability of the frame handler 1300 to locate, use, and return instances to and from their respective frames, and, in some cases, may, for example, allow one-step access to a frame with available instances.

Figure 18:
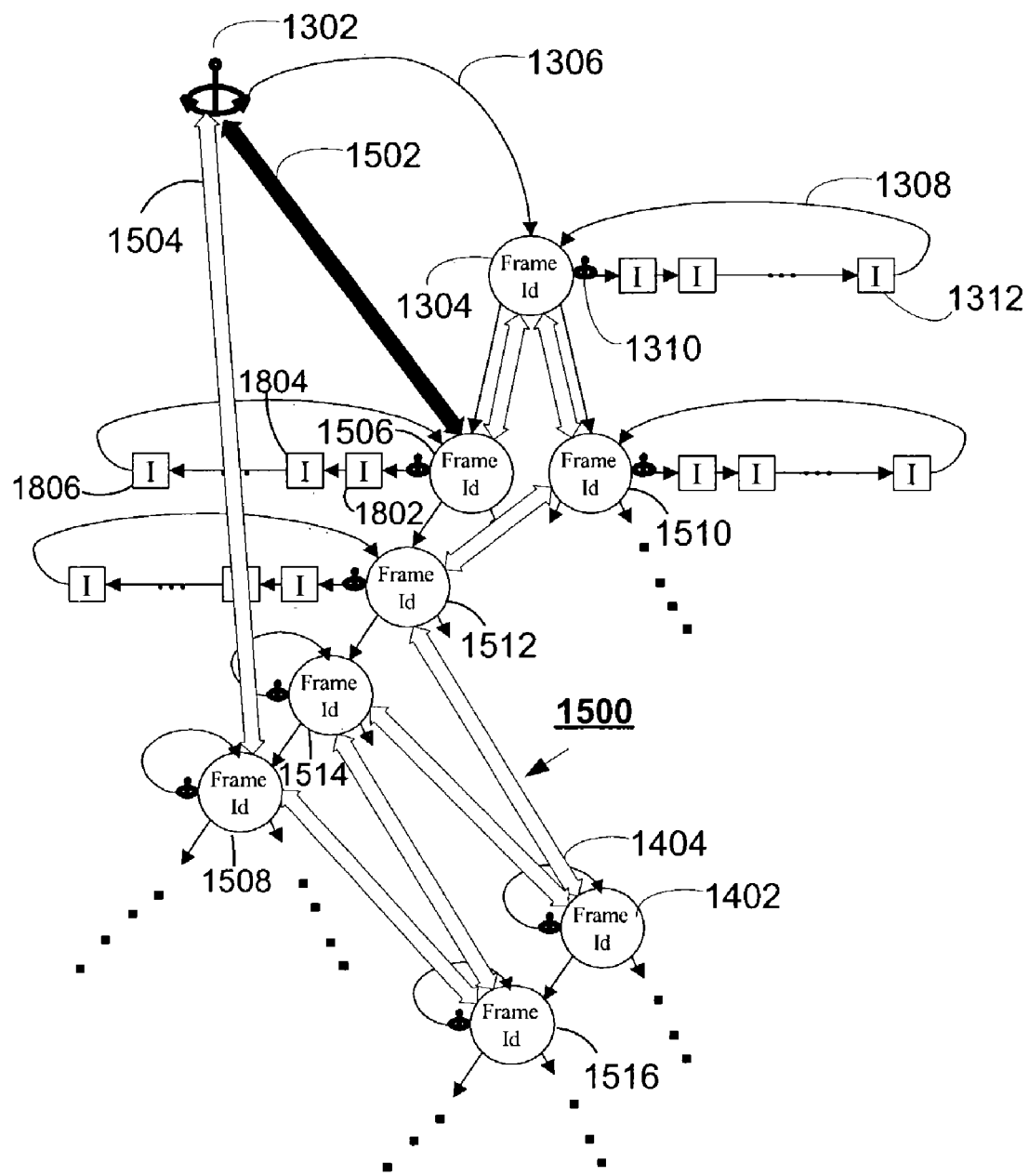
FIGS. 18 and 19 are block diagrams of a frame handler illustrating the allocation of unused instances.
Figure 19:
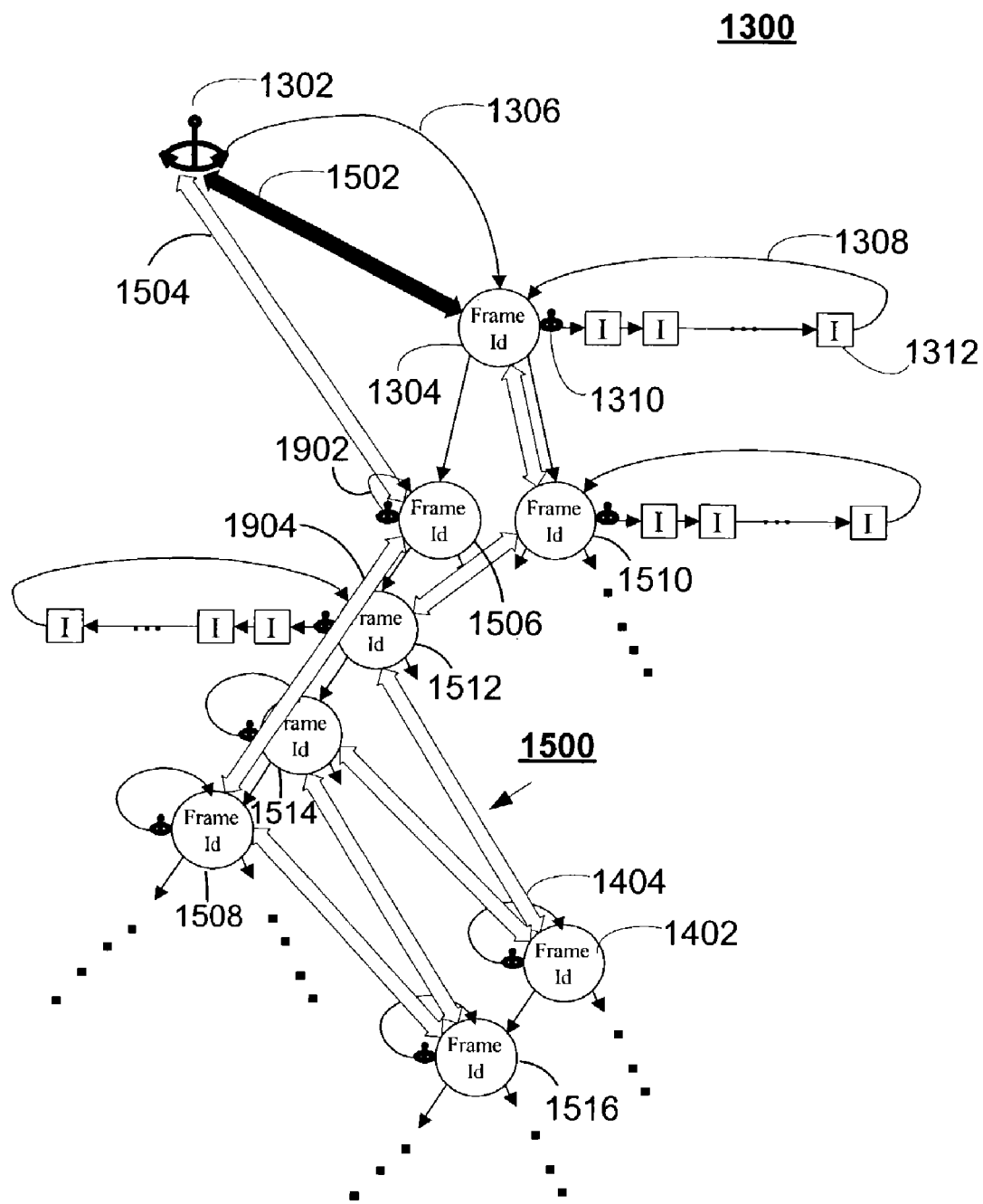

FIGS. 18 and 19 are block diagrams of a frame handler illustrating the allocation of unused instances. In FIG. 18, it is assumed that the application associated with the frame handler 1300 has determined that it requires instances for use in storing data. Therefore, the frame handler 1300 follows the not_empty pointer 1502 to the node 1506, which, as described above, represents the first node to be used when obtaining instances. Specifically, the node 1506 is associated with instances 1802, 1804, and 1806.

As shown in FIG. 19, once the instances 1802, 1804, and 1806 are accessed for use by the application, the not_empty pointer 1502 is re-located to the node 1304. Meanwhile, the node 1506 is associated with a self-pointer 1902, since it is now an empty node such as the node 1402. As a result, the node 1506 is "moved" to the empty portion of the ring 1500, by assigning the pointer 1504 from the anchor node 1302 to the node 1506, and also assigning that a pointer 1904 exists between the previously-final empty node 1508 and the node 1506.

Continuing this process logically, the not_empty pointer 1502 would be moved to the node 1510, and then to the node 1512. At this point, in the example of FIG. 19, no further nodes exist that have available instances. As a result, the not_empty pointer 1502 may be assigned to point to an empty node (i.e., a node with no available instances), and/or a new BigPage may be allocated or otherwise accessed. Conversely, as instances are returned from the application to their associated node(s), it may occur that all of the nodes are associated with not_empty frames (i.e., frames with available instances), so that the empty pointer 1504, at least temporarily until some instances are required by the application, points to a not_empty node (for example, this situation might arise in the example illustrated in FIG. 13).

Overviews of the processes that are associated with FIGS. 18 and 19, as well as associated details, are discussed below with respect to the flowcharts of FIGS. 20 and 21. Specifically, FIG. 20 is a flowchart 2000 illustrating the allocation of unused instances in more detail.

Figure 20:
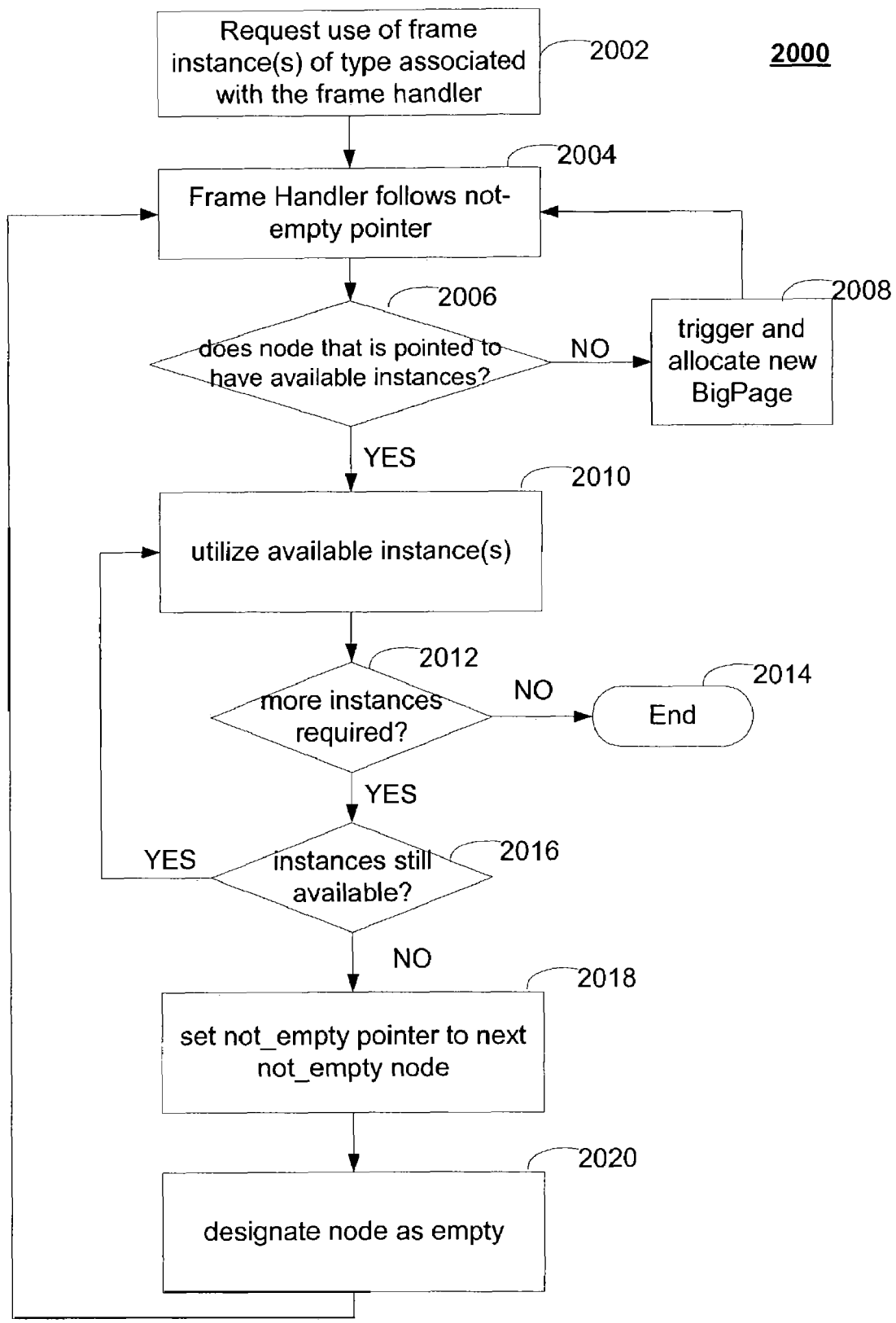
FIG. 20 is a flowchart illustrating the allocation of unused instances.

In FIG. 20, the application requests use of frame instances of a type associated with a particular frame handler (2002). Then, the frame handler 1300 follows the not_empty pointer 1502 to a node of the frame handler (2004). If the pointed-to node has no available instance(s) for use in data storage (2006), then it may be presumed that all instances are currently in use by the application, and the application may trigger and allocate a new BigPage (2008).

If the pointed-to node does have available instance(s) (2006), then the application may proceed to make use of the instance(s) (2010). If, afterwards, no more instances are required (2012), then the process may end (2014). However, if more instances are required (2012), then it may be determined whether more instances associated with the current (i.e., pointed-to) node are still available (2016).

If so, these instances are utilized (2010). If riot, then the not_empty pointer 1502 is set to the next not_empty node in the ring 1500 (2018), as shown in FIGS. 18 and 19. Then, the previously-designated node (e.g., 1506) is designated as empty (2020), and the frame handler 1300 follows the not-empty pointer 1502 to the newly-designated node having available instances. Thus, the process continues until no more instances are (immediately) required by the application.

Figure 21:
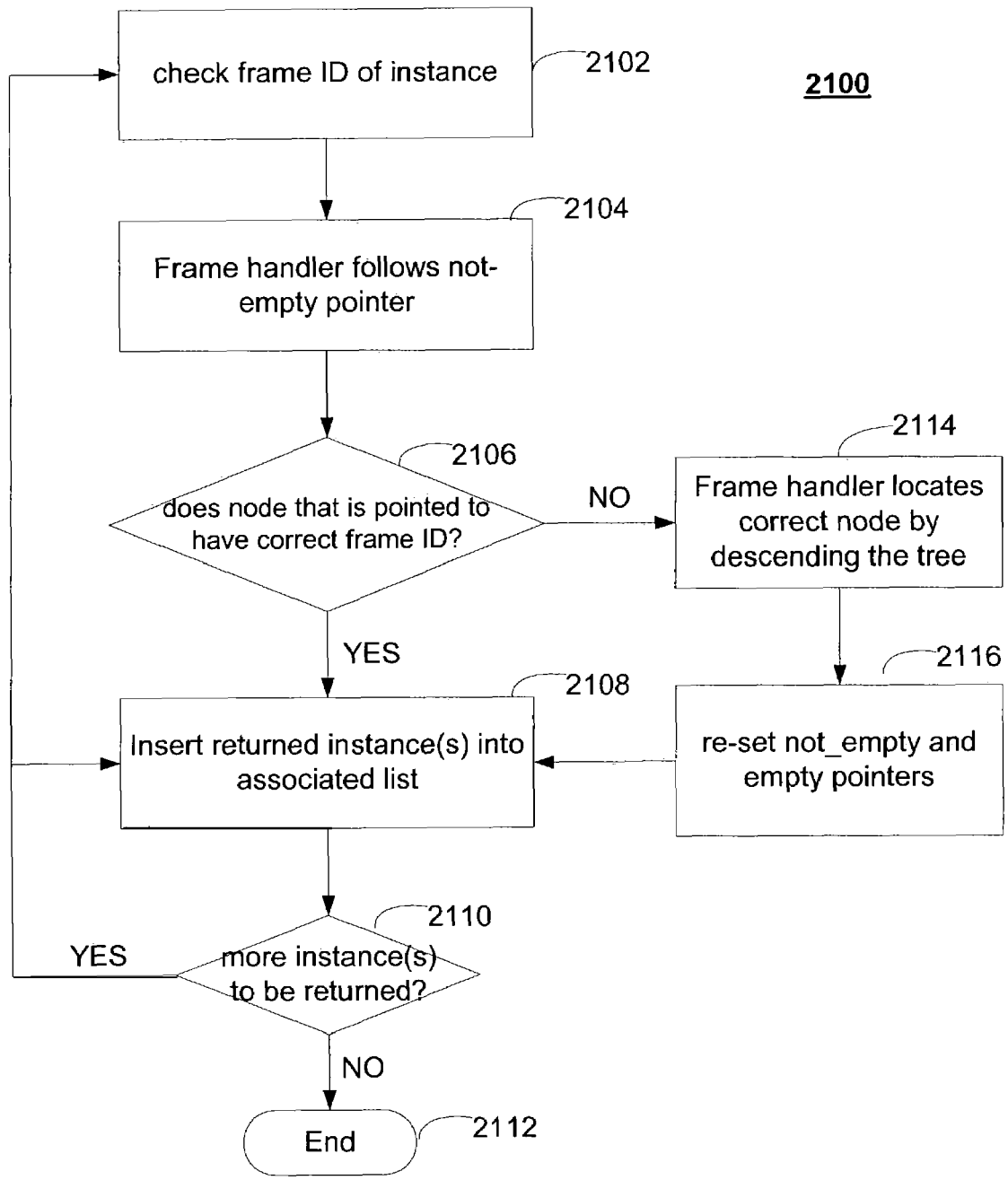
FIG. 21 is a flowchart illustrating the return of unused instances.

FIG. 21 is a flowchart 2100 illustrating the return of unused instances. That is, the process of FIG. 21 is, in one example, the inverse of the process of FIG. 20, and may generally be illustrated by viewing FIGS. 18 and 19 in reverse order and/or with consideration of the discussion below.

Specifically, returning an instance begins with checking a frame ID of the instance in question (2102). For example, in FIG. 19, the application may be seeking to return instances 1312 associated with the frame ID of the node 1304.

As a first attempt to locate the appropriate node, the frame handler 1300 may follow the not_empty pointer 1502 (2104). That is, it may be the case that the not_empty pointer 1502 is pointing directly to the node that should,be associated with the returned instances. This may occur when, for example, the application has accessed a subset of instances from a particular frame (node), and the not_empty pointer 1502 has not been moved to the next non-empty node (i.e., at least some of the instances of the particular node are still available).

Thus, if the node that is pointed to by the not_empty pointer 1502 has a frame ID matching the instance(s) in question (2106), then the instance(s) may be returned to the instance list associated with the node (2108). For example, in FIG. 19; if the frame ID of the instances 1312 matches the frame ID of the node 1304 to which the not_empty pointer 1502 points, then the frame handler 1300 simply returns the instances to the list 1308. In this case, instances may be returned quickly and efficiently.

If, after returning instances in this manner, no more instances are to be returned (2110), then the process ends (2112). If more instances need to be returned, then the instances may simply be returned to the appropriate list (2108), or, if the instances that are to be returned have a new/different frame ID, then the process may continue from the beginning (2102).

It may be the case that the not_empty pointer 1502 does not point to a node that matches the frame ID of the instance(s) in question. For example, if the instance(s) have a frame ID matching the node 1506, then the not_empty node 1502 does not, in the example of FIG. 19, point to a node matching the frame ID of the instance(s) in question. Thus, the frame handler 1300 may locate the node 1506 simply by descending the tree until the node 1506 is located (2114), i.e., by following the tree from the anchor node through the pointer 1306 and then down through the rest of the tree structure.

Then, once the correct node is located, the empty pointer 1504 and the not_empty pointer 1502 may be re-set appropriately (2116), as needed, and the instance(s) inserted (2108). For example, instances 1802, 1804, and/or 1806 may be returned to the list associated with the node 1506. The not_empty pointer 1502 may be set to point to the node 1506, and the empty pointer 1504 may be set to the node 1508, so that that configuration of FIG. 18 is re-gained.

In executing the process of FIG. 21, it may eventually occur that all nodes have available instances, so that even the empty pointer 1504 points to a node that is not, in fact, empty. In this case, the frame handler 1300 is essentially returned to the state shown in FIG. 13.

In returning instances to the frames as described above, it is not necessary to maintain an order of the instances within the frame(s). That is, as long as the frame ID of the instance and the frame match, then the instance may be returned.

Further, instances which have been returned last, i.e., used most recently, maybe designated for use the next time instances are required by the application. This "Last In, First Out" principle follows naturally from the processes described above, and serves to ensure that instances are not paged out between uses.

Figure 22:
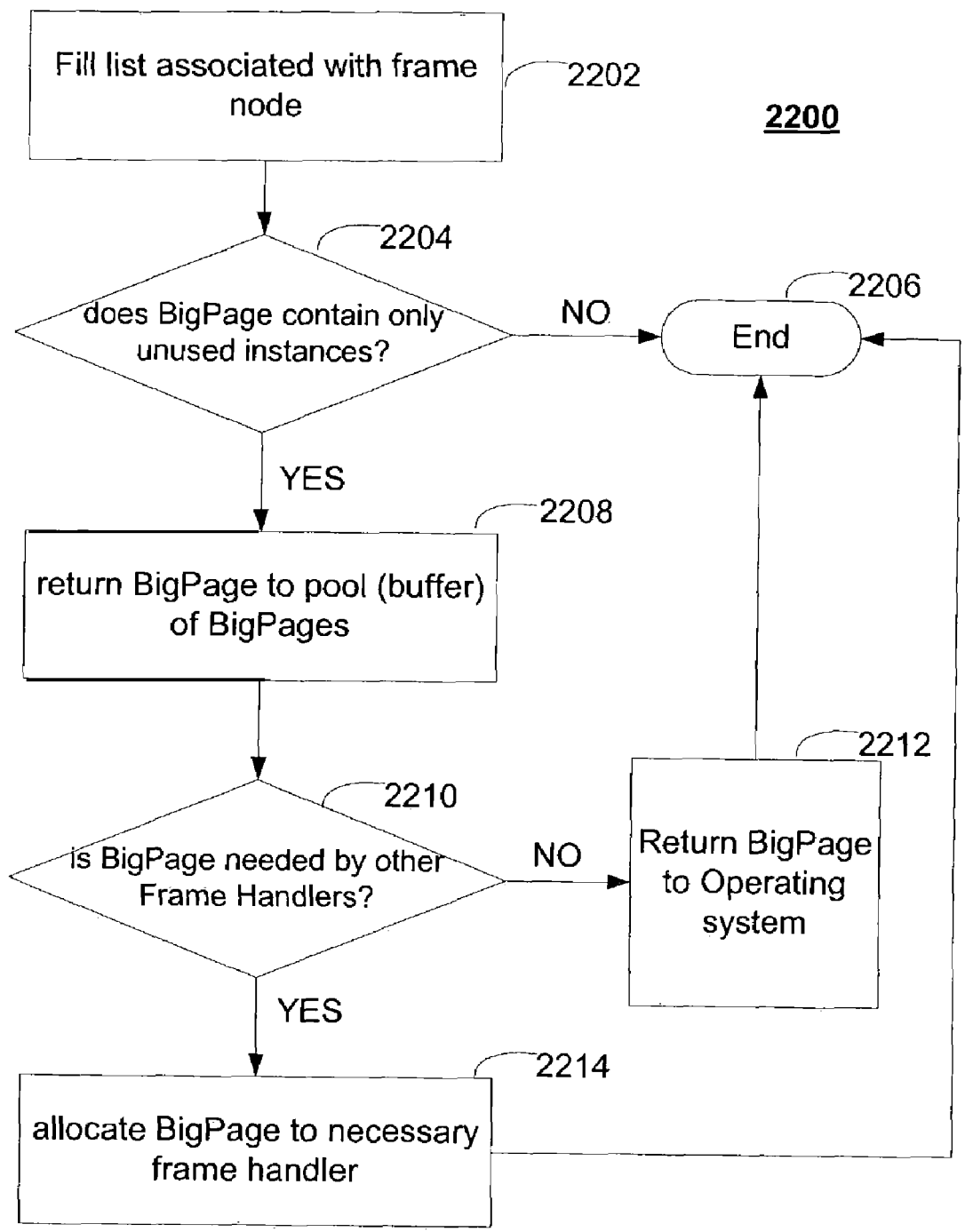
FIG. 22 is a flowchart illustrating the return of BigPages to an operating system.

FIG. 22 is a flowchart 2200 illustrating the return of BigPages to an operating system. Specifically, as discussed above, BigPages that are no longer required by the application for data storage may be returned to the operating system, perhaps via a buffer or pool of BigPages. FIG. 22 illustrates an example of such a process in conjunction with the use of frame handlers.

In FIG. 22, then, when a list of instances associated with a frame node is filled (2202), it may be ascertained whether a BigPage associated with the frame(s) of those instances contains only unused instances (2204). If not, then there is no need to return the BigPage at this time, and the process ends (2206).

Otherwise, the BigPage is returned to a pool or buffer of BigPage(s) (2208), which, as referred to above, dampens the rate of BigPages that need to be allocated to/from the operating system, particularly when large numbers of instances are needed and/or returned at the same time. The BigPage stays, unused, within the pool, until it is determined whether the BigPage is needed by other frame handlers (2210), i.e., frame handlers associated with another instance type.

If not, then, after some pre-determined period of time, the BigPage may be returned to the operating system (2212), whereupon the process ends (2206). Otherwise, the BigPage is allocated to another frame handler (2214), and the process ends (2206).

A number of implementations have been described. Nevertheless, it will be understood that various modifications may be made. Accordingly, other implementations are within the scope of the following claims.

What is claimed is:

1. A method for allocating memory in a computer system, the method comprising:
   determining a size of a memory page used by a paged virtual memory system;
   outputting a request from an application to the paged virtual memory for allocation of a block of memory by an operating system to the application, the block of memory being integer N times the size of the memory page, the integer N being greater than one;
   accessing the block of memory for the application;
   dividing the block of memory into (N−1) frames, with each of the frames operable to store an indexing structure associated with a single attribute of a data record, and each of the frames being the same size as the memory page used by the operating system;
   determining a beginning page boundary of a first whole memory page within the block of memory;
   storing the frames beginning at the beginning page boundary;
   dividing each of the frames into a plurality of instances, with each of the plurality of instances operable to store an index node of the indexing structure, the index node including left and right pointers pointing to other index nodes of the index structure having the single attribute;
   storing administrative data in a cut-off portion of the block of memory disposed in front of the beginning page boundary or behind the (N−1)th frame; and
   maintaining a data structure identifying the unused instances within each of the frames.

2. The method of claim 1 wherein maintaining the data structure identifying the unused instances within each of the frames further comprises creating a frame node corresponding to each of the frames.

3. The method of claim 2 wherein maintaining the data structure identifying the unused instances within each of the frames further comprises associating a list of unused instances with each frame node.

4. The method of claim 3 wherein associating the list of unused instances with each frame node includes creating a ring data structure comprised of unused instances.

5. The method of claim 2 wherein maintaining the data structure identifying the unused instances further comprises organizing the frame nodes in a tree structure.

6. The method of claim 5 wherein the tree structure is an AVL tree.

7. The method of claim 2 further comprising creating an anchor data structure including a ring including an empty list and a non-empty list.

8. The method of claim 7 wherein maintaining the data structure identifying the unused instances further comprises placing frame nodes with unused instances in the non-empty list and placing nodes without unused instances in the empty list.

9. The method of claim 2 wherein dividing the block of memory into the (N−1) frames includes associating a frame identifier with each of the frames.

10. The method of claim 9 wherein each frame node includes the frame identifier of its associated frame.

11. A method comprising:
    determining a size of a memory page used by a paged virtual memory system;
    outputting a request from an application to the paged virtual memory for allocation of a block of memory by an operating system to the application, the block, of memory being integer N times the size of the memory page, the integer N being greater than one;
    accessing the block of memory for the application;
    dividing the block of memory into (N−1) frames, including first and second frames, with each of the frames operable to store an indexing structure associated with a single attribute of a data record, and each of the frames being the same size as the memory page used by the operating system;
    determining a beginning page boundary of a first whole memory page within the block of memory:
    storing each of the frames beginning at the beginning page boundary;
    dividing each of the frames into a plurality of instances, including first and second lists of instances, with each of the plurality of instances operable to store an index node of the indexing structure, the index node including left and right pointers pointing to other index nodes of the index structure having the single attribute;
    assigning a first identifier that is associated with the first frame to a first frame node;
    linking the first list of instances to the first frame node;

assigning a second identifier that is associated with the second frame to a second frame node;

linking the second list of instances to the second frame node;

constructing a data structure using a plurality of nodes including the first node and the second node;

selecting available instances within each of the frames using the data structure, via the application; and storing administrative data in a cut-off portion of the block of memory disposed in front of the beginning page boundary or behind the (N−1)th frame.

12. The method of claim 11 wherein constructing the data structure further comprises constructing an AVL tree using the plurality of frame nodes.

13. The method of claim 12 wherein selecting available instances using the data structure further comprises traversing the data structure to locate the available instances.

14. The method of claim 12 further comprising superposing a linear list over the data structure, wherein the linear list includes a first pointer to an empty subset of the plurality of nodes that has no associated memory available for use by the application and a second pointer to a not_empty subset that has associated memory available for use by the application.

15. The method of claim 14 wherein the first frame node is a first not_empty frame node in the not_empty subset, and wherein selecting available instances further comprises:

following the second pointer to the first frame node; and using the first list of instances as the available instances.

16. The method of claim 15 further comprising:

re-setting the second pointer to a second not_empty frame node in the not_empty subset, and including the first node in the empty subset.

17. The method of claim 11 further comprising:

determining an origin list from which the available instances were selected; and returning the available instances to the origin list.

18. The method of claim 17 wherein determining the origin list comprises matching an identifier of the available instances to the first identifier or the second identifier.

19. The method of claim 18 wherein matching the identifier comprises following a pointer to a first not_empty frame node of a not_empty subset of the plurality of nodes, the not_empty subset including not_empty frame nodes with associated memory available for use by the application.

20. The method of claim 11 wherein the first memory portion includes a frame into which a block of memory allocated from the operating system is divided.

21. A frame handler comprising:

an application embodied on a computer readable medium, the application configured to:

determine a size of a memory page used by a paged virtual memory system, output a request from an application to the paged virtual memory for allocation of a block of memory by an operating system to the application, the block of memory being integer N times the size of the memory page, the integer N begin greater than one, access the block of memory for the application, divide the block of memory into (N−1) frames, with each of the frames operable to store an indexing structure associated with a single attribute of a data record, and each of the frames being the same size as the memory page used by the operating system, determining a beginning page boundary of a first whole memory page within the block of memory, store each of the frames beginning at the beginning page boundary, divide each of the frames into plurality of instances, with each of the plurality of instances operable to store an index node of the indexing structure, the index node including left and right pointers pointing to other index nodes of the index structure having the single attribute, store administrative data in a cut-off portion of the block of memory disposed in front of the beginning page boundary or behind the (N−1)th frame, and maintain a data structure identifying the unused instances within each of the frames.

22. The frame handler of claim 21 wherein the data structure further comprises a tree structure.

23. The frame handler of claim 22 wherein the tree structure is an AVL tree.

24. The frame handler of claim 22 wherein the tree structure includes a frame node associated with each of the plurality of frames.

25. The frame handler of claim 24 wherein each frame node is associated with a list of unused instances within the associated frame.

26. The frame handler of claim 25 wherein the list of unused instances as represented as a ring structure.

27. The frame handler of claim 24 further comprising an anchor including:

an empty list storing each frame node having no unused instances; and a non-empty list storing each frame node having unused instances.

28. The frame handler of claim 21 further comprising an operating system interface operable to allocate a block of memory such that the frame handler is operable to allocate an additional block of memory when the block of memory is exhausted.

* * * * *